US010885713B2

(12) United States Patent
Liao et al.

(10) Patent No.: US 10,885,713 B2
(45) Date of Patent: Jan. 5, 2021

(54) METHOD, APPARATUS, AND SYSTEM FOR GENERATING AN AR APPLICATION AND RENDERING AN AR INSTANCE

(71) Applicant: HISCENE INFORMATION TECHNOLOGY CO., LTD, Shanghai (CN)

(72) Inventors: Chunyuan Liao, Shanghai (CN); Rongxing Tang, Shanghai (CN); Mei Huang, Shanghai (CN)

(73) Assignee: HISCENE INFORMATION TECHNOLOGY CO., LTD, Shanghai (CN)

( * ) Notice: Subject to any disclaimer, the term of this patent is extended or adjusted under 35 U.S.C. 154(b) by 5 days.

(21) Appl. No.: 15/985,735

(22) Filed: May 22, 2018

(65) Prior Publication Data

US 2018/0276899 A1    Sep. 27, 2018

Related U.S. Application Data

(63) Continuation of application No. PCT/CN2016/107026, filed on Nov. 24, 2016.

(30) Foreign Application Priority Data

Nov. 27, 2015 (CN) .......................... 2015 1 0854250

(51) Int. Cl.
*G06T 19/00* (2011.01)
*H04L 29/08* (2006.01)
*G06K 9/00* (2006.01)

(52) U.S. Cl.
CPC ........ *G06T 19/006* (2013.01); *G06K 9/00671* (2013.01); *H04L 29/08* (2013.01); *H04L 67/32* (2013.01)

(58) Field of Classification Search
CPC combination set(s) only.
See application file for complete search history.

(56) References Cited

U.S. PATENT DOCUMENTS 8,264,505 B2    9/2012   Bathiche et al.
9,558,593 B2 *  1/2017   Tomita ................... G06F 16/00
(Continued)

FOREIGN PATENT DOCUMENTS

CN    102739872 A    10/2012
CN    103310099 A    9/2013
(Continued)

OTHER PUBLICATIONS

Amin et al., Comparative Study of Augmented Reality SDK's, Feb. 2015, International Journal on Computational Sciences & Applications (IJCSA), vol. 5, No. 1, pp. 11-26 (Year: 2015).*
(Continued)

*Primary Examiner* — Motilewa Good Johnson
(74) *Attorney, Agent, or Firm* — Kilpatrick Townsend & Stockton, LLP

(57) ABSTRACT

A method for generating an augmented reality application comprises: transmitting, to a corresponding first network device, an application creating request regarding the augmented reality application submitted by a registered user, wherein the augmented reality application includes an augmented reality processing module provided by the first network device; transmitting, to the first network device, a target image and a corresponding augmented reality instance submitted by the registered user; receiving feedback information that the target image has been associated with the augmented reality application, which is transmitted by the first network device; and releasing the augmented reality application.

22 Claims, 10 Drawing Sheets

(56) References Cited

U.S. PATENT DOCUMENTS

| | | | | |
|---|---|---|---|---|
| 10,104,208 B2* | 10/2018 | Baek | | H04N 5/23293 |
| 10,147,237 B2* | 12/2018 | Sharma | | G06F 3/04842 |
| 10,264,207 B2* | 4/2019 | Li | | H04N 5/44504 |
| 2013/0307875 A1* | 11/2013 | Anderson | | G06T 19/006 |
| | | | | 345/633 |
| 2014/0235311 A1* | 8/2014 | Weising | | G09G 5/08 |
| | | | | 463/14 |
| 2014/0253743 A1 | 9/2014 | Loxam et al. | | |
| 2014/0302915 A1* | 10/2014 | Lyons | | G07F 17/3225 |
| | | | | 463/25 |
| 2014/0313226 A1* | 10/2014 | Feiner | | G06F 1/1694 |
| | | | | 345/633 |
| 2015/0262208 A1* | 9/2015 | Bjontegard | | G06Q 30/0205 |
| | | | | 705/7.31 |
| 2016/0098860 A1* | 4/2016 | Basra | | H04L 67/325 |
| | | | | 345/633 |
| 2016/0133230 A1* | 5/2016 | Daniels | | G06F 3/147 |
| | | | | 345/633 |
| 2016/0217615 A1* | 7/2016 | Kraver | | G06T 19/006 |
| 2017/0301140 A1* | 10/2017 | Smith | | G06T 19/006 |
| 2018/0124370 A1* | 5/2018 | Bejot | | G06T 11/00 |
| 2018/0286129 A1* | 10/2018 | Harviainen | | G06F 3/1423 |
| 2018/0308287 A1* | 10/2018 | Daniels | | G06T 19/20 |

FOREIGN PATENT DOCUMENTS

| | | |
|---|---|---|
| CN | 104238729 A | 12/2014 |
| CN | 105046213 A | 11/2015 |
| CN | 105338117 A | 2/2016 |

OTHER PUBLICATIONS

Supplementary European Search Report for European Patent Application No. 16868000.7 dated Feb. 12, 2019, 16 pages.

* cited by examiner

METHOD, APPARATUS, AND SYSTEM FOR GENERATING AN AR APPLICATION AND RENDERING AN AR INSTANCE

CROSS REFERENCE TO RELATED APPLICATIONS

This application is a continuation of PCT/CN2016/107026 filed 2016 Nov. 24, which claims priority to CN 201510854250.6 filed 2015 Nov. 27, both of which are incorporated herein by reference.

TECHNICAL FIELD

The present disclosure relates to an augmented reality technology in the computer field, and more particularly relates to a technology for generating an augmented reality application and rendering an augmented reality instance.

BACKGROUND

Augmented reality is an innovative human-machine interaction technology in a sub-field of a nature picture recognition technology, which overlays in real time digital information such as a virtual 3D animation, a video, a text, a picture to a real scene to display and achieves a natural interaction with a real object or a user. The augmented reality highlights a natural human-machine visual interaction with fusion of virtuality and reality. An augmented reality technology covers new technologies and new means such as multimedia, 3D modeling, real-time video display and control, multi-sensor fusion, real-time tracking and registration, scene fusion, etc. The advanced and novel nature of the augmented reality technology causes its applications and promotions ever stagnant.

With the development of hardware technologies, miniaturization of the video camera devices and display devices, particularly the prevalence of mobile devices and emergence of wearable devices, the augmented reality technology has been gradually pervasive in people's daily lives, because the traditional interactive modes cannot satisfy the people's demands. Further, many developers are daunted by the leading-edge computer vision and computer graphics technologies, which are difficult and highly demanding. In recent years, with the development of the augmented reality technology, some mature commercial augmented reality applications have been launched in the market, and some commercial or open-source augmented reality SDKs (Software Development Kit) have also come forth. The developers may use these SDKs to perform simple augmented reality application developments on mobile devices to implement functions of augmented reality.

However, with the constant development of the Internet and the increasing maturity of the augmented reality technology, terminal-based simple augmented reality applications cannot satisfy the big data demands of the Internet. When an augmented reality application developer is developing an augmented reality application for an augmented reality service provider, he will not only consider which SDK to choose to implement the augmented reality business logic of the terminal, but also will consider provision of services to store and manage service contents with a large data amount to the augmented reality service provider. However, various major augmented reality SDKs currently only provide an augmented reality technology that implements terminal-based augmented reality applications with a small data amount. The consequence is that the augmented reality developer needs to additionally develop a complete system for the augmented reality service provider to store and manage the augmented reality service contents. During the process of implementing the system for managing the augmented reality service contents, the augmented reality developer has to know in-depth the specific details regarding implementation of the augmented reality technology, which greatly increases the development cost and prolongs the development period.

In view of the above, the existing technical solutions for developing the augmented reality application always lack a complete set of augmented reality development services available to the augmented reality application developers and the augmented reality service providers, and most of the solutions only provide technical supports for developing terminal-based augmented reality applications, without considering the development trend of the Internet big data. This is disadvantageous to generate Internet-based augmented reality applications with mass data and to develop augmented reality services, causes great inconvenience to so many augmented reality application developers and augmented reality service providers, and impedes the development of augmented reality applications and the growth of augmented reality services.

SUMMARY

An objective of the present disclosure is to provide a method and an apparatus for generating an augmented reality application and rendering an augmented reality instance, thereby providing developers and common users with a service platform for the augmented reality technology, which service platform is friendly to development, management, mass storage, and use.

According to one aspect of the present disclosure, there is provided a method for generating an augmented reality application at a first user equipment end, comprising:

transmitting, to a corresponding first network device, an application creating request regarding the augmented reality application submitted by a registered user, wherein the augmented reality application includes an augmented reality processing module provided by the first network device;

transmitting, to the first network device, a target image and a corresponding augmented reality instance submitted by the registered user;

receiving feedback information that the target image has been associated with the augmented reality application, which is transmitted by the first network device; and releasing the augmented reality application.

According to another aspect of the present disclosure, there is provided a method for generating an augmented reality application at a first network device end, comprising:

receiving an application creating request regarding the augmented reality application submitted via a corresponding first user equipment by a registered user, wherein the augmented reality application includes an augmented reality processing module provided by the first network device;

acquiring a target image and a corresponding augmented reality instance, which are transmitted by the registered user via the first user equipment;

extracting feature information of the target image, establishing a mapping relationship between the feature information and the augmented reality instance, and saving the mapping relationship in a cloud database; and associating the target image with the augmented reality application based on the application creating request transmitted by the first user equipment, and transmitting feedback information that the target image has been associated with the augmented reality application to the first user equipment.

According to another aspect of the present disclosure, there is provided a method for rendering an augmented reality instance at a second user equipment end, comprising:

acquiring, on the second user equipment, a target image in an image captured by an augmented reality application;

extracting feature information of the target image;

determining a target augmented reality instance corresponding to the target image based on the feature information; and rendering the target augmented reality instance through the augmented reality application.

According to another aspect of the present disclosure, there is provided a method for rendering an augmented reality instance at a second network device end, comprising:

acquiring a target image and application identification information of a corresponding augmented reality application, which are transmitted by a corresponding second user equipment;

authenticating the augmented reality application based on the application identification information;

extracting feature information of the target image after the augmented reality application passes the authentication, and performing a matching query in a cloud database corresponding to the second network device based on the feature information so as to obtain a second augmented reality instance matching the target image; and returning the second augmented reality instance to the second user equipment.

According to another aspect of the present disclosure, there is provided a first user equipment for generating an augmented reality application, wherein the first user equipment comprises:

an eleventh device configured for transmitting, to a corresponding first network device, an application creating request regarding the augmented reality application submitted by a registered user, wherein the augmented reality application includes an augmented reality processing module provided by the first network device;

a twelfth device configured for transmitting, to the first network device, a target image and a corresponding augmented reality instance submitted by the registered user;

a thirteenth device configured for receiving feedback information that the target image has been associated with the augmented reality application, which is transmitted by the first network device; and a fourteenth device configured for releasing the augmented reality application.

According to another aspect of the present disclosure, there is provided a first network device for generating an augmented reality application, wherein the first network device comprises:

a twenty-first device configured for receiving an application creating request regarding the augmented reality application submitted via a corresponding first user equipment by a registered user, wherein the augmented reality application includes an augmented reality processing module provided by the first network device;

a twenty-second device configured for acquiring a target image and a corresponding augmented reality instance, which are transmitted by the registered user via the first user equipment;

a twenty-third device configured for extracting feature information of the target image, establishing a mapping relationship between the feature information and the augmented reality instance, and saving the mapping relationship in a cloud database; and a twenty-fourth device configured for associating the target image with the augmented reality application based on the application creating request transmitted by the first user equipment, and transmitting feedback information that the target image has been associated with the augmented reality application to the first user equipment.

According to another aspect of the present disclosure, there is provided a system for generating an augmented reality application, comprising at least one of: foregoing first user equipment and foregoing first network device.

According to another aspect of the present disclosure, there is provided a second user equipment for rendering an augmented reality application, wherein the second user equipment comprises:

a thirty-first device configured for acquiring, on the second user equipment, a target image in an image captured by an augmented reality application;

a thirty-second device configured for extracting feature information of the target image;

a thirty-third device configured for determining a target augmented reality instance corresponding to the target image based on the feature information; and a thirty-fourth device configured for rendering the target augmented reality instance through the augmented reality application.

According to another aspect of the present disclosure, there is provided a second network device for rendering an augmented reality application, wherein the second network device comprises:

a forty-first device configured for acquiring a target image and application identification information of a corresponding augmented reality application, which are transmitted by a corresponding second user equipment;

a forty-second device configured for authenticating the augmented reality application based on the application identification information;

a forty-third device configured for extracting feature information of the target image after the augmented reality application passes the authentication, and performing a matching query in a cloud database corresponding to the second network device based on the feature information so as to obtain a second augmented reality instance matching the target image; and;

a forty-fourth device configured for returning the second augmented reality instance to the second user equipment.

According to another aspect of the present disclosure, there is provided a system for rendering an augmented reality application, comprising at least one of: foregoing second user equipment and foregoing second network device.

Compared with the prior art, according to the embodiments of the present disclosure, during the phrase of generating an augmented reality application, the first user equipment transmits, to the corresponding first network device, an application creating request regarding an augmented reality application submitted by a registered user, and a target image and a corresponding augmented reality instance submitted by the registered user; the first network device extracts feature information of the target image, establishes a mapping relationship between the feature information and the augmented reality instance, saves the mapping relationship in a cloud database, associates the target image and the augmented reality application based on the application creating request, and transmits, to the first user device, feedback information that the target image has been associated with the augmented reality application; then, the first user equipment releases the successfully created augmented reality application.

Further, according to the embodiments of the present disclosure, pre-fetching by local recognition and cloud recognition and a smart switching function therebetween are implemented through the cooperation between the second user equipment and the second network device for rendering the augmented reality instance, and by pre-caching a local recognition packet having part of augmented reality instances, firstly performing local recognition with the local recognition packet, and then performing cloud recognition after failure of the local recognition, problems such as excessively occupying the storage space and too long network response delay are avoided. Besides, the recognition patterns may be switched based on the user's needs in the real scene, which satisfies the versatility of the user scene needs. The second user device not only implements the recognition and tracking function of the underlying object, but also may provide functions of facilitating presentation of the augmented reality content, including presentation of video and 3D animation content. The second user equipment interprets and executes the script file through an interaction controlling submodule, thereby implementing a cross-platform augmented reality interaction definition mechanism, thereby being suited for multiple platforms and causing the user' interactive behaviors more flexible. The second user equipment supports region tracking, fuzzy recognition, and fuzzy recognition tracking, which increases the versatility of augmented reality presentation.

Further, the second network device further supports recording log information of the augmented reality application, including tracking, recording, and statistical information, which increases the accuracy of running information of the augmented reality application.

Further, the augmented reality application comprises an augmented reality processing module provided by the first network device, the augmented reality processing module encapsulating a plurality of submodules for implementing augmented reality services, so as to be capable of realizing smart switching between local recognition and network end recognition, region tracking, fuzzy recognition, fuzzy tracking recognition, and 3D rendering of an augmented reality instance of an augmented reality application, as well as supporting a multi-platform script interaction function.

BRIEF DESCRIPTION OF THE DRAWINGS

Other features, objectives, and advantages of the present disclosure will become more apparent through reading the detailed description of the non-limiting embodiments with reference to the drawings below.

DETAILED DESCRIPTION OF EMBODIMENTS

Hereinafter, the present disclosure will be described in further detail with reference to the accompanying drawings:

The present disclosure aims to provide a method and an apparatus for generating an augmented reality application and rendering an augmented reality instance, and a system platform built based on the apparatus.

Figure 1:
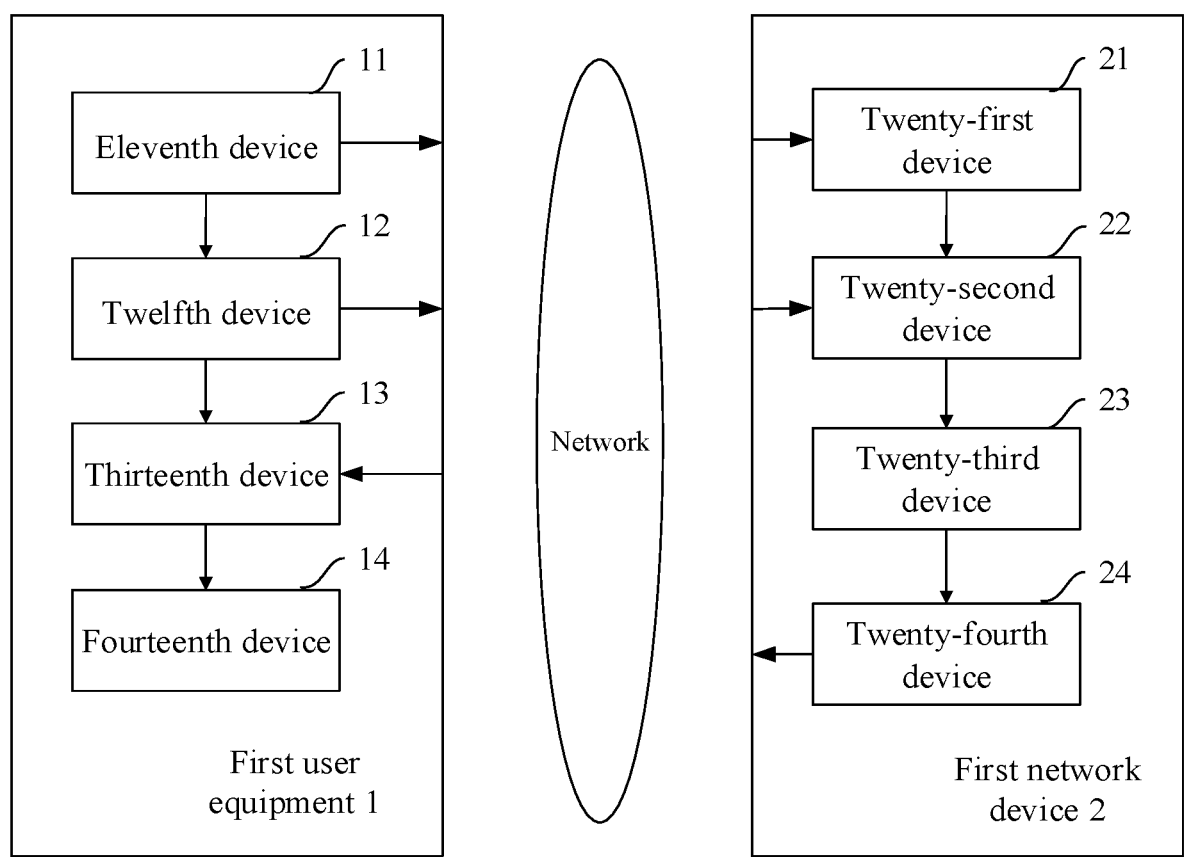
FIG. 1 shows a structural schematic diagram of cooperation between a first user equipment and a first network device for generating an augmented reality application provided according to an aspect of the present disclosure.

FIG. 1 shows a schematic diagram of cooperation between a first user equipment and a first network device for generating an augmented reality application provided according to an aspect of the present disclosure.

Particularly, the first user equipment 1 comprises: a eleventh device 11, a twelfth device 12, a thirteenth device 13, and a fourteenth device 14. Particularly, the eleventh device 11 transmits, to a corresponding first network device 2, an application creating request regarding an augmented reality application submitted by a registered user, wherein the augmented reality application includes an augmented reality processing module provided by the first network device 2; the twelfth device 12 transmits, to the first network device 2, a target image and a corresponding augmented reality instance submitted by the registered user; the thirteenth device 13 receives feedback information that the target image has been associated with the corresponding augmented reality application, which is transmitted by the first network device 2; and the fourteenth device 14 releases the augmented reality application.

The first network device 2 comprises: a twenty-first device 21, a twenty-second device 22, a twenty-third device 23, and a twenty-fourth device 24. Particularly, the twenty-first device 21 receives the application creating request regarding an augmented reality application submitted via the corresponding first user equipment 1 by the registered user, wherein the augmented reality application includes an augmented reality processing module provided by the first network device 2; the twenty-second device 22 acquires a target image and a corresponding augmented reality instance transmitted via the first user equipment 1 by the registered user; the twenty-third device 23 extracts feature information of the target image and establishes a mapping relationship between the feature information and the augmented reality instance, and saves the mapping relationship in a cloud database; and the twenty-fourth device 24 associates the target image and the augmented reality application based on the application creating request transmitted by the first user equipment 1, and transmits feedback information that the target image has been associated with the augmented reality application to the first user equipment 1.

Here, the first user equipment 1 includes, but not limited to, any mobile electronic product that enables a human-machine interaction with a user via a touch pad, e.g., a smart mobile phone, a PDA, etc.; the mobile electronic product may employ any OS (operating system), e.g., the Android OS, the IOS OS, etc. Preferably, the first user equipment 1 may also be a script program running on a device integrated with a touch terminal via a network. The first network device 2 includes, but not limited to, an electronic device which may automatically perform numerical value computation and information processing according to preset or stored instructions, hardware of which electronic device includes, but not limited to, a microprocessor, an application-specific integrated circuit (ASIC), a field programmable gate array (FPGA), a digital processor (DSP), an embedded device, etc. The network includes, but not limited to, the Internet, a wide area network, a metropolitan area network, a local area network, a VPN network, and a wireless ad-hoc network, etc. Preferably, the first network device 2 may also be a script program running on the user equipment, or on a device where the user equipment is integrated with the network device and a touch terminal via a network or where the network device is integrated with a touch terminal via a network. Of course, those skilled in the art should understand that the first user equipment 1 and the first network device 2 are only examples, and other existing or future possibly developed first user equipment 1 and first network device 2, if applicable to the present disclosure, should also fall into the protection scope of the present disclosure, which are incorporated herein by reference.

According to the embodiments of the present disclosure, during the phrase of generating an augmented reality application, the first user equipment 1 transmits, to the corresponding first network device 2, an application creating request regarding an augmented reality application submitted by a registered user, and a target image and a corresponding augmented reality instance submitted by the registered user; the first network device 2 extracts feature information of the target image, establishes a mapping relationship between the feature information and the augmented reality instance, saves the mapping relationship in a cloud database, associates the target image with the augmented reality application based on the application creating request, and transmits, to the first user device 1, feedback information that the target image has been associated with the augmented reality application; then, the first user equipment 1 releases the successfully created augmented reality application.

According to an embodiment of the present disclosure, during the stage of generating an augmented reality application, the first network device 2 provides the first user equipment 1 with a uniform registration and creation platform for the augmented reality application, and a storage service for storing the target image and corresponding augmented reality instance of the augmented reality application; the first user equipment 1 develops and releases the augmented reality application based on the augmented reality processing module provided by the first network device 2.

Here, the target image may be a picture, a photograph, a scene image, a real object image, or an object with a specific shape, etc. The augmented reality instance may include an associated augmented reality content (including, but not limited to, video, audio, link, 2D animation, 3D animation, etc.) and a corresponding augmented reality display effect.

Here, the augmented reality application comprises an augmented reality processing module provided by the first network device 2. In this embodiment, the augmented reality processing module comprises at least one of: a local recognizing submodule for locally recognizing an image captured by the augmented reality application; a fuzzy recognizing submodule for fuzzily recognizing the image captured by the augmented reality application; a region tracking submodule for tracking a set region in the augmented reality instance corresponding to the image captured by the augmented reality application; a fuzzy tracking submodule for fuzzily tracking of a set target in the augmented reality instance corresponding to the image captured by the augmented reality application; an interaction controlling submodule for controlling an interaction between a user and the augmented reality instance corresponding to the image captured by the augmented reality application; and a 3D engine submodule for rendering the augmented reality instance corresponding to the image captured by the augmented reality application.

By encapsulating a plurality of submodules for implementing augmented reality services, the augmented reality processing module may realize smart switching between local recognition and network end recognition, region tracking, fuzzy recognition, fuzzy tracking recognition, and 3D rendering of the augmented reality instance of the augmented reality application, as well as supporting a multi-platform script interaction function.

Specifically, according to a preferred embodiment of the present disclosure, with the augmented reality processing module, the user may invoke a corresponding submodule only by inheriting a fragment of the augmented reality processing module during the stage of development, which results in a simple and flexible interface. Further, the invoking interface provided by the local recognition submodule provides a function of switching between recognition patterns, such that the user may easily switch recognition patterns by changing the parametric variables of the invoking interface corresponding to the local recognition submodule. The recognition patterns include: automatic recognition, manual recognition, cloud recognition, and local recognition. Preferably, the augmented reality processing module according to the present disclosure comprises a 3D engine submodule, which supports importing of a plurality of 3D models without making various kinds of complex conversions or modifications; meanwhile, the 3D engine submodule is encapsulated with an OpenGL library (Open Graphics Library, a cross-programming language graphic program interface) render module, such that the user may conveniently create 2D and 3D ARWidgets without leveraging a third-party 3D development library such as Unity; besides, a series of controls for 3D animations are defined and implemented in the 3D engine submodule (such as animation play speed, start frame and end frame of animation play, etc.), which are encapsulated in an ARPanel object. During the development stage, the user is only needed to define the object ARPanel to develop according his own needs without understanding its internal implementation details, for example, but not limited to:

ARPanel test1=ARPanel //define an ARpanel object, import a 3D animation test1. setARWidgetVisible(1122,true) //set components visible Further, the interaction controlling submodule realizes support of the script language through a built-in script language interpreter, thereby supporting various kinds of application platforms (e.g., IOS, Android, Windows, etc.), and supporting the Lua script file to realize augmented reality interaction. The user may update augmented reality interaction by updating the Lua script at the background or switch the script file locally, causing the interaction more flexible and versatile. Particularly, the augmented reality processing module is preferably a software development kit (SDK) that integrally encapsulates augmented reality functions; the SDK implements a complex augmented reality algorithm and a 3D rendering algorithm at the underlying layer and encapsulates them into a library file; then, under each platform (e.g., IOS, Android, Windows, etc.), further encapsulates the library file into a simple interface in conjunction with logics such as a camera control logic, an FSM state control logic, etc., such that the user may complete development the augmented reality application with reference to the SDK use manual without knowing implementation details.

Preferably, the BaseFragment of the SDK (software development kit) is an augmented reality interface base class; during the stage of generating an augmented reality instance, the first user equipment 1 may develop an augmented reality recognition tracking interface by inheriting the BaseFragment; the ARPanel (augmented reality control panel) includes a set of augmented reality effects, which may include a plurality of ARWidgets(augmented reality effect widgets), wherein the ARWidgets include ARImage (AR Image), ARVideo (augmented reality video), ARAudio (AR audio), etc., wherein the Lua interface enables development of an interaction logic between the ARWidgets using the Lua language. Besides, the complex augmented reality algorithm and the 3D rendering algorithm are implemented at the underlying layer of the software application development module, which are encapsulated into a library file. In this way, with reference to the SDK use manual, an augmented reality application developer may complete development of the augmented reality application by simply invoking the interface without knowing the implementation details.

Further, the eleventh device 11 comprises: a eleventh unit (now shown) and a twelfth unit (not shown), wherein the eleventh unit (not shown) transmits, to a corresponding first network device 2, an application creating request regarding the augmented reality application submitted by a registered user; the twelfth unit loads the augmented reality processing module provided by the first network device 2 into the target application to acquire the augmented reality application based on the target application. Specifically, quick loading may be implemented by only inheriting one fragment of the SDK.

Further, the first user equipment 1 further comprises a fifteenth device 15 that receives use log information regarding the augmented reality application and transmitted by the first network device 2. Correspondingly, the first network device 2 comprises a twenty-fifth device 25 that transmits, to the first user equipment 1, the use log information regarding the augmented reality application. Particularly, the use log information preferably comprises tracking, recording and statistical information of the augmented reality application, and the use log information will constantly update data based on use stages of the augmented reality application.

Preferably, the augmented reality processing module of the augmented reality application comprises a local recognizing submodule for locally recognizing the image captured by the augmented reality application; correspondingly, the first network device 2 further comprises: a twenty-sixth device 26 and a twenty-seventh device 27, wherein the twenty-sixth device 26 generates a corresponding local recognition packet based on the feature information, the augmented reality instance, and the mapping relationship; and the twenty-seventh device 27 provides the local recognition packet to the first user equipment 1.

The first network device 2 extracts feature information of the target image transmitted by the first user equipment 1, generates a cloud feature index based on the feature information, the augmented reality instance and a mapping relationship between the feature information and the augmented reality instance, and updates and saves the feature information, the augmented reality instance, and the cloud feature index into the cloud database; besides, the first network device 2 also generates a local feature index based on the feature information, the augmented reality instance, and the mapping relationship between the feature information and the augmented reality instance; and during the stage of generating the augmented reality application, the first network device 2 may transmit one or more augmented reality instances, the feature information corresponding to each augmented reality instance, and the local feature index, to the first user equipment 1 based on device information of the first user equipment 1.

In a preferred embodiment, based on the cloud mass data and the local constant data, the feature information saved in the cloud feature index is established based on the mass data, and the feature information saved by the local feature index may have different amounts of information based on different algorithms; the subsequent recognition process based on the local feature index and the cloud feature index may adopt different matching algorithms to enhance recognition efficiency and save resource space.

The first network device 2 further comprises a twenty-eighth device 28 that acquires management operation information transmitted by the registered user, and manages the user information, the target image, the corresponding augmented reality instance, and the augmented reality application information based on the management operation information. The twenty-eighth device 28 provides an administration backend that may interact with an administrator user. The administration backend may be a Web-based display layer application, providing functions such as account registration, login, logout, viewing or changing identity information, changing password information, creating, deleting, and modifying the application, creating, modifying, deleting, and releasing the target image and the augmented reality instance, etc.

Figure 2:
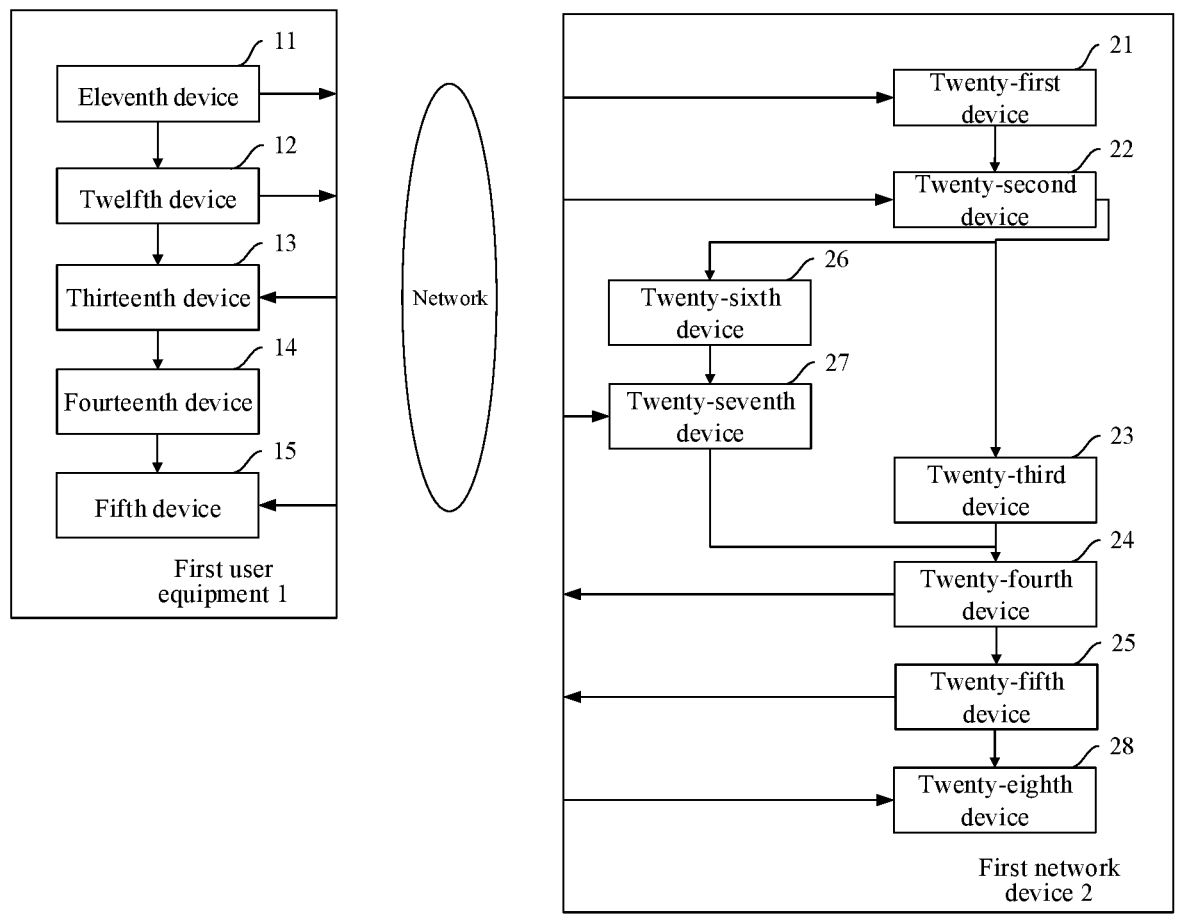
FIG. 2 shows a structural schematic diagram of cooperation between a first user equipment and a first network device for generating an augmented reality application provided according to a preferred embodiment of the present disclosure.

According to another aspect of the present disclosure provides a system for generating an augmented reality application. The system comprises a first user equipment 1 and a first network device 2 as described in the foregoing embodiments of the present disclosure; the contents of the devices of the system related to generating the augmented reality are identical or substantially identical to the contents in the schematic diagram of the cooperation between the first user equipment 1 and the first network device 2 as shown in FIG. 2, which thus will not be detailed for the sake of conciseness.

Figure 3:
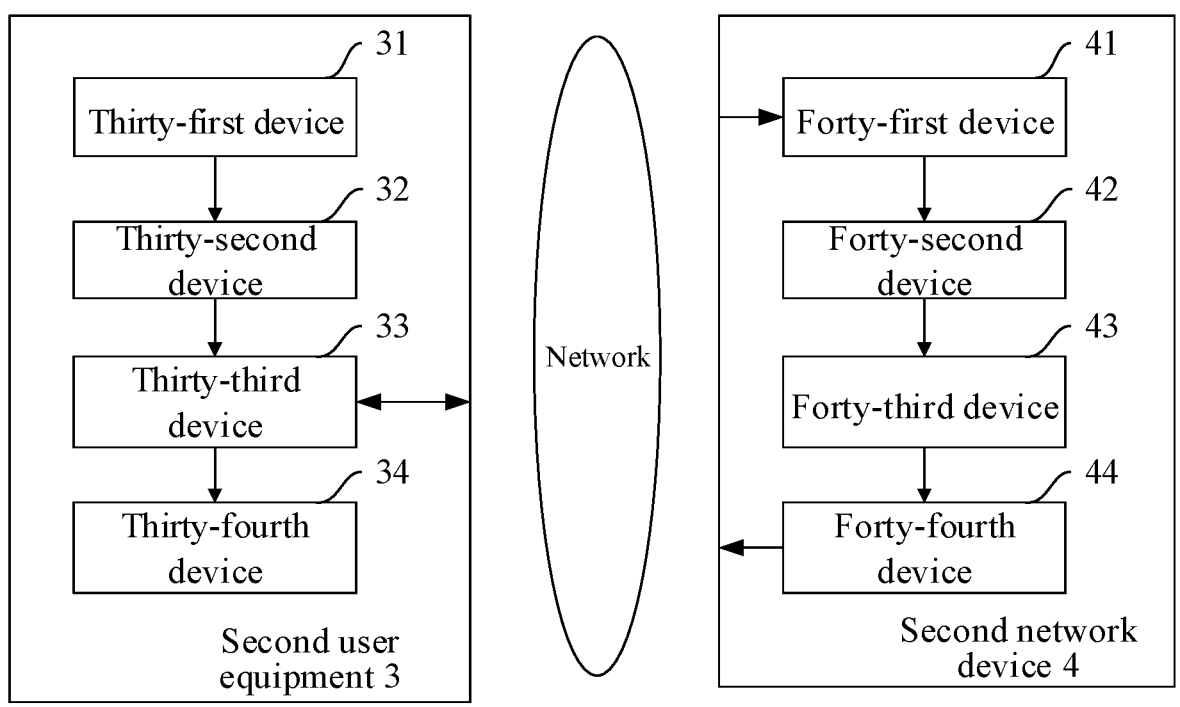
FIG. 3 shows a structural schematic diagram of cooperation between a second user equipment and a second network device for rendering an augmented reality instance provided according to an aspect of the present disclosure.

FIG. 3 shows a structural schematic diagram of cooperation between a second user equipment and a second network device for rendering an augmented reality instance provided according to another aspect of the present disclosure;

The second user equipment 3 comprises a thirty-first device 31, a thirty-second device 32, a thirty-third device 33, and a thirty-fourth device 34, wherein the thirty-first device 31 acquires a target image in images captured by the augmented reality application on the second user equipment; the thirty-second device 32 extracts feature information of the target image; the thirty-third device 33 determines a target augmented reality instance corresponding to the target image based on the feature information; and the thirty-fourth device 34 renders the target augmented reality instance through the augmented reality application.

The second network device 4 comprises a forty-first device 41, a forty-second device 42, a forty-third device 43, and a forty-fourth device 44. Particularly, the forty-first device 41 acquires a target image and application identification information corresponding to the augmented reality application, which are transmitted by a corresponding second device; the forty-second device 42 authenticates the augmented reality application based on the application identification information; the forty-third device 43 extracts feature information of the target image after the augmented reality application passes the authentication, and performs a matching query in the cloud database corresponding to the second network device based on the feature information so as to obtain a second augmented reality instance matching the target image; and the forty-fourth device 44 returns the second augmented reality instance to the second user equipment.

Here, the second user equipment 3 includes, but not limited to, any mobile electronic product that enables a human-machine interaction with a user via a touch pad, e.g., a smart mobile phone, a PDA, etc.; the mobile electronic product may employ any OS (operating system), e.g., the Android OS, the IOS OS, etc. Preferably, the second user equipment 3 may also be a script program running on a device integrated with a touch terminal via a network. The second network device 4 includes, but not limited to, an electronic device which may automatically perform numerical value computation and information processing according to preset or stored instructions, hardware of which includes, but not limited to, a microprocessor, an application-specific integrated circuit (ASIC), a field programmable gate array (FPGA), a digital processor (DSP), an embedded device, etc. The network includes, but not limited to, the Internet, a wide area network, a metropolitan area network, a local area network, a VPN network, and a wireless Ad Hoc network, etc. Preferably, the second network device 4 may also be a script program running on the user equipment, or on a device where the user equipment is integrated with the network device and a touch terminal via a network or where the network device is integrated with a touch terminal via a network.

Besides, the second user equipment 3 and the first user equipment 1 are user equipments in the stage of generating the augmented reality application and the stage of rendering the augmented reality instance, such that they may adopt a same user equipment or a different user equipment; likewise, the second network device 4 and the first network device 2 are instance devices in the stage of generating the augmented reality application and the stage of rendering the augmented reality instance, such that they may adopt a same or a different network device.

Of course, those skilled in the art should understand that the second user equipment 3 and the second network device 4 are only examples, and other existing or future possibly developed second user equipment 3 and second network device 4, if applicable to the present disclosure, should also fall into the protection scope of the present disclosure, which are incorporated herein by reference.

In a preferred embodiment, the second network device 4 may implement, through a Cloud API, processes of receiving the target image, authenticating, performing cloud recognition, and transmitting the augmented reality instance and the corresponding feature information, while the Cloud API mainly performs cloud service request and answer via HTTP. Specifically, the forty-first device 41 may acquire, via the Cloud API, the target image and the application identification information of the corresponding augmented reality application, which are transmitted by a corresponding second user equipment; the forty-second device 42 may authenticate the augmented reality application via the Cloud API; the forty-third device 43 may perform cloud matching query via the Cloud API; and the forty-fourth device 44 may return the second augmented reality instance to the second user equipment 3 via the Cloud API.

Here, the augmented reality application has an augmented reality processing module. The content of the augmented reality processing module is identical or substantially identical to the content of the augmented reality processing module in the aforementioned stage of generating the augmented reality application, which thus will not be detailed here for the sake of conciseness and is incorporated here by reference.

In the stage where the user uses the augmented reality application to render the augmented reality instance, the second user equipment 3 captures an image with an image acquiring device (e.g., a video camera, an augmented reality eyewear, etc.), matches and recognizes feature information of the target image among the captured images, and after a successful matching, presents the target augmented reality instance corresponding to the target image.

The second user equipment 3 may adopt a recognition method of smart switching between the local and the cloud, i.e., first recognizing at the local; in the case of failure, automatically switching to cloud recognition.

Besides, the local recognition submodule for locally recognizing the image captured by the augmented reality application provides an invoking interface; by inputting different parameters to the invoking interface, different recognition patterns of the second user equipment 3 may be realized, i.e., local recognition, cloud recognition, and smart switching.

Figure 5:
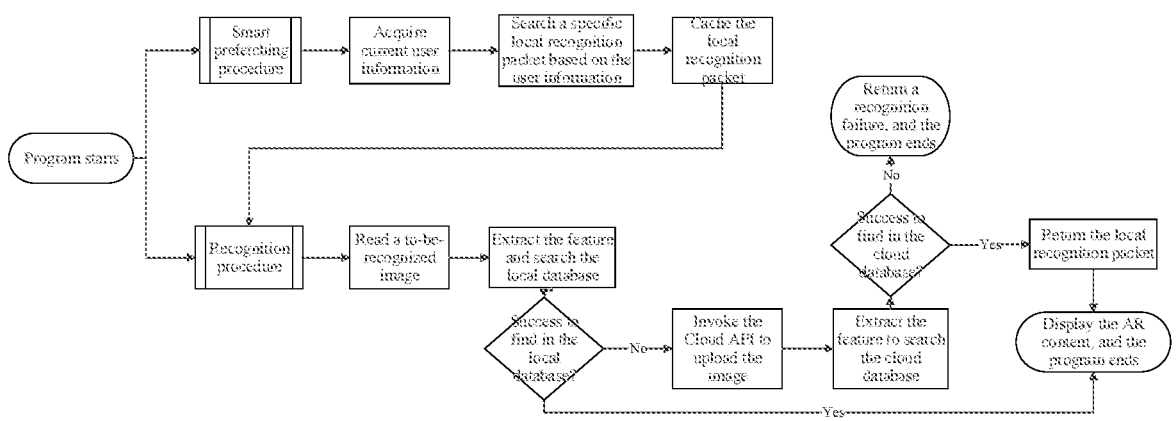
FIG. 5 shows a process schematic diagram of implementing smart switching between a local recognition and a cloud recognition through cooperation between the second user equipment and the second network device in a preferred embodiment of the present disclosure.

FIG. 5 shows a process schematic diagram of implementing a smart switching between the local recognition and the cloud recognition through cooperation between the second user equipment and the second network device in a preferred embodiment of the present disclosure. Before local recognition, the second network device further comprises a forty-sixth device 46 that transmits a local recognition packet corresponding to the augmented reality application to the second user equipment, wherein the local recognition packet includes one or more augmented reality instances and feature information corresponding to each augmented reality instance. The second user equipment 3 further comprises a thirty-fifth device 35 that receives the local recognition packet corresponding to the augmented reality application provided by the second network device 4, wherein the local recognition packet includes one or more augmented reality instances and feature information corresponding to each augmented reality instance; specifically the second user equipment 3 transmits, to the second network device 4, current user information, for example, including the time and location information of the augmented reality application, and relevant information of a registered user using the augmented reality application, etc.; the second network device 4 feeds back a specific local recognition packet based on the current information, and the second user equipment 3 caches the local recognition packet.

Next, the thirty-first device 31 of the second user equipment 3 acquires, on the second user equipment, a target image in the images captured by the augmented reality application; the thirty-second device 32 extracts feature information of the target image; the thirty-third device 33 performs matching query in the local recognition packet based on the feature information, and in the case of a successful matching, acquires a target augmented reality instance corresponding to the target image from the local recognition packet to complete the recognition locally.

If no matching result for the feature information is found in the local recognition packet, the thirty-first unit (not shown) of the thirty-third device 33 transmits the target image and application identification information of the augmented reality application to the second network device 4, such that the second network device 4 performs a cloud matching query; the forty-first device 41 of the second network device 4 acquires the target image and the application identification information corresponding to the augmented reality application, which are transmitted by the corresponding second user equipment 3, wherein each augmented reality application will create, during the stage of generating the augmented reality application, a unique application recognition information for identifying the identity of the augmented reality application; the forty-second device 42 authenticates the augmented reality application based on the application identification information; the forty-third device 43 extracts feature information of the target image when the augmented reality application passes the authentication, and performs matching query in the cloud database corresponding to the second network device 4 based on the feature information to obtain a second augmented reality instance matching the target image, the cloud database including a cloud database established during the stage of generating the augmented reality application; the forty-fourth device 44 returns the second augmented reality instance to the second user equipment; next, the thirty-second unit (not shown) of the thirty-third device 33 receives the second augmented reality instance matching the target image and the application identification information and fed back by the second network device 4, as the target augmented reality instance corresponding to the target image. After obtaining the corresponding target augmented reality instance, the thirty-fourth device 34 renders the target augmented reality instance through the augmented reality application. Preferably, the second user equipment 3 further comprises a thirty-sixth device 36 and a thirty-seventh device 37, wherein after the thirty-sixth device 36 receives the second feature information corresponding to the second augmented reality instance and transmitted by the second network device, the thirty-seventh device 37 updates the local recognition packet based on the second augmented reality instance and its corresponding second feature information; further, the second network device 4 further comprises a forty-fifth device 45 that returns the second feature information corresponding to the second augmented reality instance to the second user equipment; the thirty-seventh device 37 updates the local recognition packet based on the second augmented reality instance and its corresponding second feature information. When the user re-recognizes the target image with the second user device 3, it may directly present the corresponding target augmented reality instance after obtaining the query matching result through the local recognition packet, which thereby reduces the times of cloud recognition access and speeds up system reaction.

Here, the target image may be a picture, a photograph, a scene image, a real object image, or an object with a specific shape, etc. The local recognition packet may include one or more augmented reality instances and its corresponding feature information. The augmented reality instance may include: associated augmented reality content (including, but not limited to, video, audio, link, 2D animation, 3D animation, etc.) and a corresponding augmented reality display effect.

In a preferred scene, the second user equipment 3 is configured for recognizing a certain real scene. For example, in a sightseeing scene, the second user equipment 3 receives all recognition packets of a corresponding sightseeing scene transmitted by the second network device 4 based on the geographical location of the user; the user then may perform local recognition within the sightseeing scene; when the user leaves the corresponding sightseeing scene to another scene, the second user equipment 3 may acquire an augmented reality instance other than the sightseeing scene using cloud recognition and presents it.

Further, the second user equipment 3 further comprises: a thirty-eighth device 38 and a thirty-ninth device 39, wherein the thirty-eighth device 38 determines a target object corresponding to the target image; the thirty-ninth device 39 generates a processed preferred target augmented reality instance based on the target object and the target augmented reality instance; correspondingly, the thirty-fourth device 34 renders the processed preferred target augmented reality instance through the augmented reality application.

Figure 6:
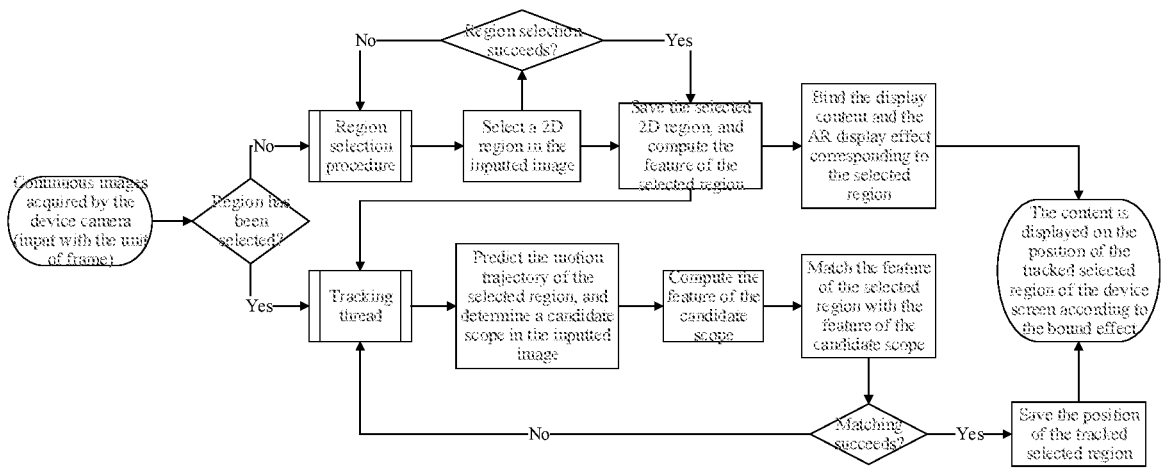
FIG. 6 shows a process schematic diagram of implementing region tracking by the second user equipment in a preferred embodiment of the present disclosure.

FIG. 6 shows a process schematic diagram of implementing region tracking by the second user equipment in a preferred embodiment of the present disclosure. In a preferred embodiment, the second user equipment 3 may also recognize and track continuous images (e.g., video, etc.) with respect to a specified region, so as to present the corresponding reality instance in the specified region.

Specifically, after the second user equipment 3 acquires continuous images (input with a unit of frames) and captures the images using an image acquisition device, the thirty-eighth device 38 first determines whether the user has already selected a region; if not, it enters the stage of region selection, so as to determine a specified region as the target object by acquiring the user's region selection operation, acquire feature information of the specified region, and bind the feature information and the corresponding target augmented reality effect; next, the thirty-third unit (not shown) of the thirty-ninth device 39 of the second user equipment 3 predicts a motion trajectory of the target image, and selects a candidate region from the target image based on the motion trajectory; the thirty-fourth unit of the thirty-ninth device 39 matches the feature information of the candidate region with the feature information of the target object, and when the match succeeds, determines the accurate position information of the target object; the thirty-fifth unit of the thirty-ninth device 39 associates the target instance with the accurate position information to generate a processed preferred target augmented reality instance, thereby implementing that in the continuous images, the preferred target augmented reality instance is presented following the position of the specified region of the real scene selected by the user. Here, the thirty-third unit may invoke a region tracking submodule of the augmented reality processing module, which tracks a set region in the augmented reality instance corresponding to the image captured by the augmented reality application to thereby implement region tracking.

Figure 7:
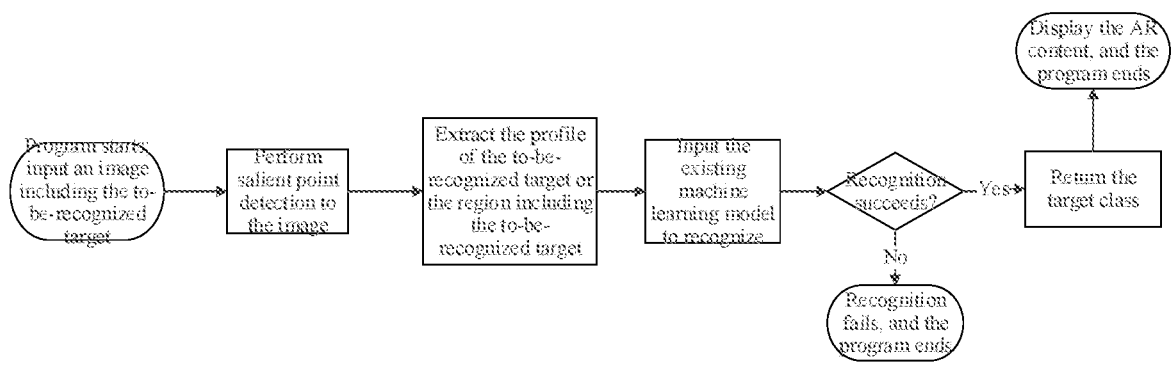
FIG. 7 shows a process schematic diagram of implementing fuzzy recognition by the second user equipment in a preferred embodiment of the present disclosure.

FIG. 7 shows a process schematic diagram of implementing fuzzy recognition by the second user equipment in a preferred embodiment of the present disclosure. In another preferred embodiment, the second user equipment 3 may also perform fuzzy recognition based on a class of target objects rather than a single target object.

Specifically, the second user equipment 3 first captures a target image in the images; a thirty-sixth unit 36 of the thirty-eighth device performs salient point detection to the feature of the target image and extracts a profile of the fuzzy recognition object or a region including the fuzzy recognition object in the target image; a thirty-seventh unit (not shown) of the thirty-eighth device 38 recognizes the profile of the fuzzy recognition object or the region including the fuzzy recognition object based on a machine learning model so as to determine that the fuzzy recognition object is the target object. Next, the thirty-fifth unit of the thirty-ninth device 39 associates the target instance with the accurate position information to generate a processed preferred target augmented reality instance. Here, the thirty-seventh unit may invoke the fuzzy recognizing submodule for fuzzily recognizing the image captured by the augmented reality application to recognize the fuzzy recognition object.

Here, the fuzzy recognition is not directed to a certain frame of image or a certain object, but to a non-specific object. Such non-specific object may be: objects of the same kind, e.g., apple, banana, etc.; objects of the same topological structure, e.g., web, star, etc.; objects of the same geometrical shape, e.g., rectangle, round, etc.; the class recognition model used by the fuzzy recognition is a model already learned in advance through a machine learning method, wherein the training data may be based on the data provided during use process of a plurality of augmented reality applications.

Figure 8:
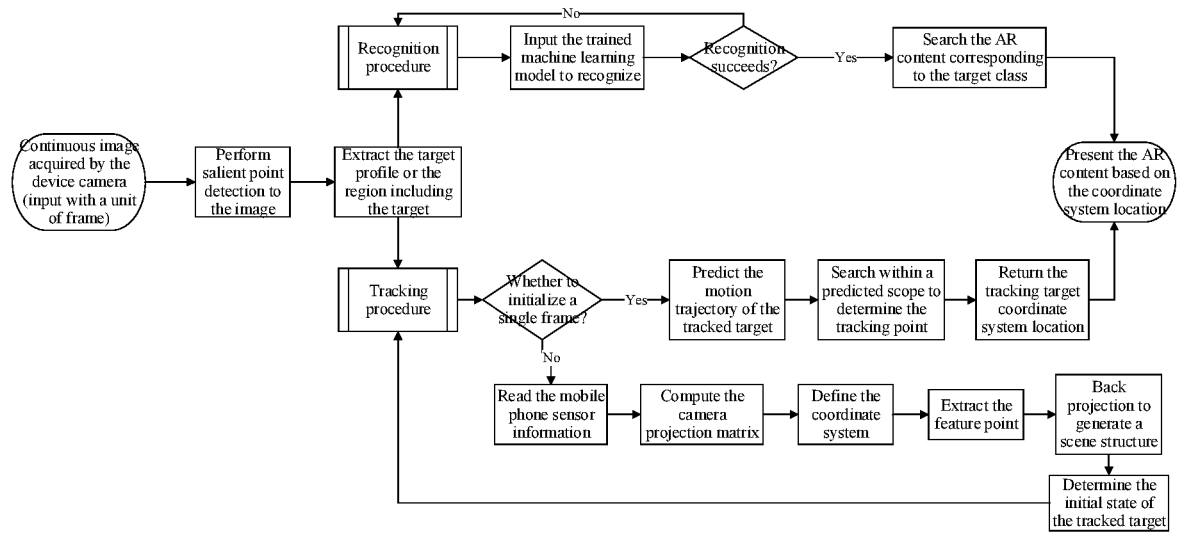
FIG. 8 shows a process schematic diagram of implementing fuzzy recognition tracking by the second user equipment in a preferred embodiment of the present disclosure.

FIG. 8 shows a process schematic diagram of implementing fuzzy recognition tracking by the second user equipment in a preferred embodiment of the present disclosure. In another preferred embodiment, the second user equipment 3 may also perform fuzzy recognition based on a class of target objects rather than a single target object and track the fuzzy recognition object.

Specifically, the second user equipment 3 first captures a target image in the images; a thirty-sixth unit (not shown) of the thirty-eighth device performs salient point detection to the feature of the target image, and extracts a profile of the fuzzy recognition object in the target image or a region including the fuzzy recognition object in the target image; a thirty-seventh unit (not shown) of the third eighth device 38 recognizes the profile of the fuzzy recognition object or the region including the fuzzy recognition object based on a machine learning model so as to determine that the fuzzy recognition object is the target object. Next, the thirty-fifth unit of the thirty-ninth device 39 associates the target instance with the accurate position information to generate a processed preferred target augmented reality instance.

Next, the thirty-third unit (not shown) of the thirty-ninth device 39 of the second user equipment 3 predicts a motion trajectory of the target image (i.e., the fuzzy recognition object), and selects a candidate region from the target image based on the motion trajectory; the thirty-fourth unit of the thirty-ninth device 39 matches the feature information of the candidate region with the feature information of the target object, and when the matching succeeds, determines the accurate position information of the target object; the thirty-fifth unit of the thirty-ninth device 39 associates the target instance with the accurate position information to generate a processed preferred target augmented reality instance, for example, presenting the target instance at an accurate position in the target object, presenting the target instance around the accurate position of the target object (e.g., presenting surrounding the target object, presenting above, below, left, or right to the target object), thereby implementing that in the continuous images, the preferred target augmented reality instance is presented following the position of the specified region of the real scene selected by the user. Here, a fuzzy tracking submodule of the augmented reality processing module for fuzzily tracking a set target in the augmented reality instance corresponding to the image captured by the augmented reality application may be invoked to implement fuzzy recognition tracking.

Further, the augmented reality processing module comprises a 3D engine submodule for rendering the augmented reality instance corresponding to the image captured by the augmented reality application, and the thirty-fourth device 34 comprises: a thirty-eighth unit for determining whether the augmented reality instance is a 3D animation; if so, invoking the 3D engine submodule in the augmented reality application to render the augmented reality instance.

Further, the thirty-fourth device 34 further comprises: a thirty-ninth unit (not shown) that acquires an interaction script file defined by the user, invokes an interaction controlling submodule in the augmented reality application to interpret and execute the interaction script file, and renders the augmented reality instance based on a result of executing the interaction script file. Specifically, the thirty-ninth unit acquires the interactive operation executed by the user, reads information about the user's operation (click, slide, etc.), interprets and executes a function in the corresponding script to modify display parameter, for example, modify the display parameter of the 3D animation; and re-invokes the 3D engine to display the corresponding augmented reality instance, to thereby complete the interactive process. Particularly, the thirty-ninth unit may leverage an interaction controlling submodule of the augmented reality processing module for controlling interactions between the user and the augmented reality instance corresponding to the image captured by the augmented reality application to thereby implement interaction.

Specifically, the script file is prepared by the developer in advance; the interaction controlling submodule of the augmented reality processing module has an interpreter having a script language, which may interpret the script file for interaction submitted by the user and executes the interpreted interaction language. What is provided below is an instance (test.lua) of an LUA script (a kind of script language):
```
ARPanel=nil
function onARPanelInit(ARPanel)
ARPanel=ARPanel
ARPanel:setARWidgetVisible(1111, true);
End
```

Besides, the second network device 4 provides an administration backend that may interact with an administrator user. The administration backend may be a Web-based display layer application, providing functions such as account registration, login, logout, viewing or changing identity information, changing password information, creating, deleting, and modifying the application, creating, modifying, deleting, and releasing the target image and the augmented reality instance, etc. The second network device 4 continuously updates the use log information in the stage of rendering the augmented reality application, including tracking, recording, and statistical information of the augmented reality application, etc., and renders them through the administration backend upon request by an administrator user.

Figure 4:
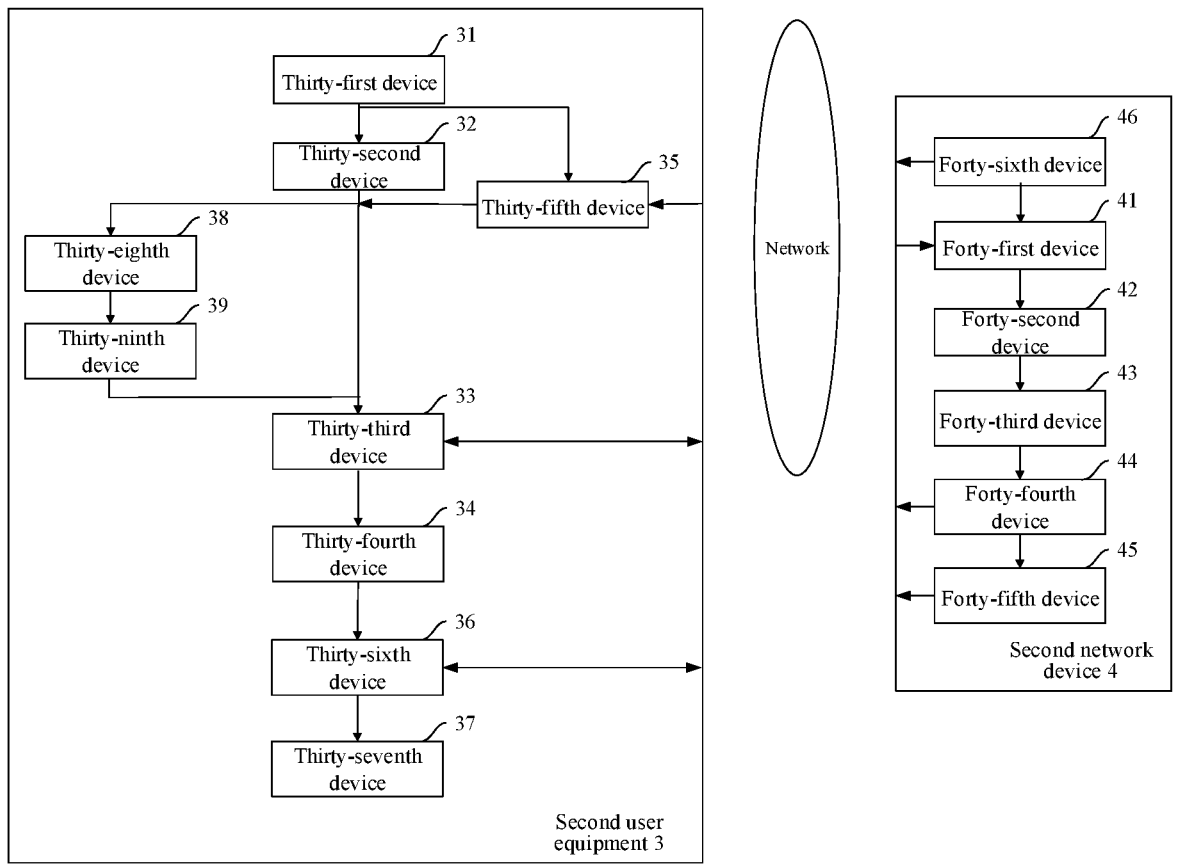
FIG. 4 shows a structural schematic diagram of cooperation between a second user equipment and a second network device for rendering an augmented reality instance provided according to an aspect of the present disclosure.

Another aspect of the present disclosure provides a system for rendering an augmented reality application. The system comprises the second user equipment 3 and the second network device 4 as described in the foregoing embodiments of the present disclosure, the contents of the devices of the system related to generating the augmented reality are identical or substantially identical to the contents in the schematic diagram of the cooperation between the second user equipment 3 and the second network device 4 as shown in FIG. 4, which thus will not be detailed for the sake of conciseness, but are incorporated herein by reference.

Compared with the prior art, according to the embodiments of the present disclosure, pre-fetching by local recognition and cloud recognition and a smart switching function there between are implemented through the cooperation between the second user equipment and the second network device for rendering the augmented reality instance, and by pre-caching a local recognition packet having part of augmented reality instances, firstly performing local recognition with the local recognition packet, and then performing cloud recognition after failure of the local recognition, problems such as excessively occupying the storage space and too long network response delay are avoided. Besides, the recognition patterns may be switched based on the user's needs in the real scene, which satisfies the versatility of the user scene needs. The second user equipment not only implements the recognition and tracking function of the underlying object, but also may provide functions of facilitating presentation of the augmented reality content, including presentation of video and 3D animation content. The second user equipment interprets and executes the script file through an interaction controlling submodule, thereby implementing a cross-platform augmented reality interaction definition mechanism, thereby being suited for multiple platforms and causing the user' interactive behaviors more flexible. The second user equipment supports region tracking, fuzzy recognition, and fuzzy recognition tracking, which increases the versatility of augmented reality presentation.

Further, the second network device further supports recording log information of the augmented reality application, including tracking, recording, and statistical information, which increases the accuracy of running information of the augmented reality application.

Figure 9:
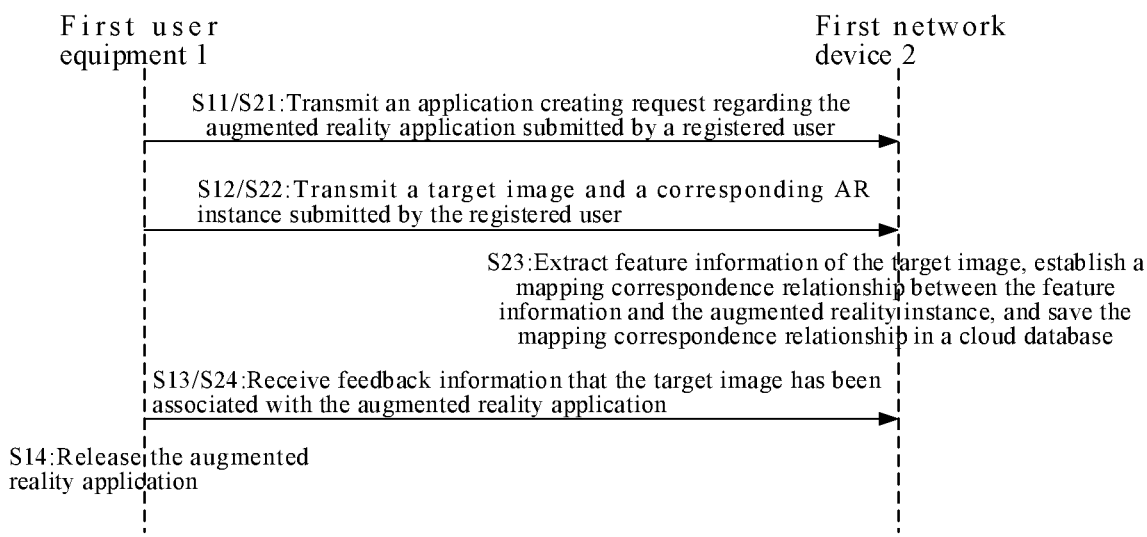
FIG. 9 shows a method schematic diagram of cooperation between a first user equipment and a first network device for generating an augmented reality application provided according to an aspect of the present disclosure.

FIG. 9 shows a method schematic diagram of cooperation between a first user equipment and a first network device for generating an augmented reality application provided according to an aspect of the present disclosure. The method for generating an augmented reality application in the first user equipment comprises: a step S11, a step S12, a step S13, and a step S14. Particularly, in the step S11, the first user equipment 1 transmits, to a corresponding first network device 2, an application creating request regarding an augmented reality application submitted by a registered user, wherein the augmented reality application includes an augmented reality processing module provided by the first network device 2; in the step S12, the first user equipment 1 transmits, to the first network device 2, a target image and a corresponding augmented reality instance submitted by the registered user; in the step S13, the first user equipment 1 receives feedback information that the target image has been associated with the corresponding augmented reality application, which is transmitted by the first network device 2; and in the step S14, the first user equipment 1 releases the augmented reality application.

The method for generating an augmented reality application in the first network device 2 comprises: a step S21, a step S22, a step S23, and a step S24. Particularly, in the step S21, the first network device 2 receives the application creating request regarding an augmented reality application submitted via the corresponding first user equipment 1 by the registered user, wherein the augmented reality application includes an augmented reality processing module provided by the first network device 2; in the step S22, the first network device 2 acquires a target image and a corresponding augmented reality instance transmitted via the first user equipment 1 by the registered user; in the step S23, the first network device 2 extracts feature information of the target image and establishes a mapping relationship between the feature information and the augmented reality instance, and saves the mapping relationship in a cloud database; and in the step S24, the first network device 2 associates the target image and the augmented reality application based on the application creating request transmitted by the first user equipment 1, and transmits feedback information that the target image has been associated with the augmented reality application to the first user equipment 1.

Here, the first user equipment 1 includes, but not limited to, any mobile electronic product that enables a human-machine interaction with a user via a touch pad, e.g., a smart mobile phone, a PDA, etc.; the mobile electronic product may employ any OS (operating system), e.g., the Android OS, the IOS OS, etc. Preferably, the first user equipment 1 may also be a script program running on a device integrated with a touch terminal via a network. The first network device 2 includes, but not limited to, an electronic device which may automatically perform numerical value computation and information processing according to preset or stored instructions, hardware of which electronic device includes, but not limited to, a microprocessor, an application-specific integrated circuit (ASIC), a field programmable gate array (FPGA), a digital processor (DSP), an embedded device, etc. The network includes, but not limited to, the Internet, a wide area network, a metropolitan area network, a local area network, a VPN network, and a wireless Ad Hoc network, etc. Preferably, the first network device 2 may also be a script program running on the user equipment, or on a device where the user equipment is integrated with the network device and a touch terminal via a network or where the network device is integrated with a touch terminal via a network. Of course, those skilled in the art should understand that the first user equipment 1 and the first network device 2 are only examples, and other existing or future possibly developed first user equipment 1 and first network device 2, if applicable to the present disclosure, should also fall into the protection scope of the present disclosure, which are incorporated herein by reference.

According to the embodiments of the present disclosure, during the phrase of generating an augmented reality application, the first user equipment 1 transmits, to the corresponding first network device 2, an application creating request regarding an augmented reality application submitted by a registered user, and a target image and a corresponding augmented reality instance submitted by the registered user; the first network device 2 extracts feature information of the target image, establishes a mapping relationship between the feature information and the augmented reality instance, saves the mapping relationship in a cloud database, associates the target image with the augmented reality application based on the application creating request, and transmits, to the first user device 1, feedback information that the target image has been associated with the augmented reality application; then, the first user equipment 1 releases the successfully created augmented reality application.

According to an embodiment of the present disclosure, during the stage of generating an augmented reality application, the first network device 2 provides the first user equipment 1 with a uniform registration and creation platform for the augmented reality application, and a storage service for storing the target image and corresponding augmented reality instance of the augmented reality application; the first user equipment 1 develops and releases the augmented reality application based on the augmented reality processing module provided by the first network device 2.

Here, the target image may be a picture, a photograph, a scene image, a real object image, or an object with a specific shape, etc. The augmented reality instance may include an associated augmented reality content (including, but not limited to, video, audio, link, 2D animation, 3D animation, etc.) and a corresponding augmented reality display effect.

Here, the augmented reality application comprises an augmented reality processing module provided by the first network device 2. In this embodiment, the augmented reality processing module comprises at least one of: a local recognizing submodule for locally recognizing an image captured by the augmented reality application; a fuzzy recognizing submodule for fuzzily recognizing the image captured by the augmented reality application; a region tracking submodule for tracking a set region in the augmented reality instance corresponding to the image captured by the augmented reality application; a fuzzy tracking submodule for fuzzily tracking of a set target in the augmented reality instance corresponding to the image captured by the augmented reality application; an interaction controlling submodule for controlling an interaction between a user and the augmented reality instance corresponding to the image captured by the augmented reality application; and a 3D engine submodule for rendering the augmented reality instance corresponding to the image captured by the augmented reality application.

By encapsulating a plurality of submodules for implementing augmented reality services, the augmented reality processing module may realize smart switching between local recognition and network end recognition, region tracking, fuzzy recognition, fuzzy tracking recognition, and 3D rendering of the augmented reality instance of the augmented reality application, as well as supporting a multi-platform script interaction function.

Specifically, according to a preferred embodiment of the present disclosure, with the augmented reality processing module, the user may invoke a corresponding submodule only by inheriting a fragment of the augmented reality processing module during the stage of development, which results in a simple and flexible interface. Further, the invoking interface provided by the local recognition submodule provides a function of switching between recognition patterns, such that the user may easily switch recognition patterns by changing the parametric variables of the invoking interface corresponding to the local recognition submodule. The recognition patterns include: automatic recognition, manual recognition, cloud recognition, and local recognition. Preferably, the augmented reality processing module according to the present disclosure comprises a 3D engine submodule, which supports importing of a plurality of 3D models without making various kinds of complex conversions or modifications; meanwhile, the 3D engine submodule is encapsulated with an OpenGL library (Open Graphics Library, a cross-programming language graphic program interface) render module, such that the user may conveniently create 2D and 3D ARWidgets without leveraging a third-party 3D development library such as Unity; besides, a series of controls for 3D animations are defined and implemented in the 3D engine submodule (such as animation play speed, start frame and end frame of animation play, etc.), which are encapsulated in an ARPanel object. During the development stage, the user is only needed to define the object ARPanel to develop according his own needs without understanding its internal implementation details, for example, but not limited to:

ARPanel test1=ARPanel //define an ARpanel object, import a 3D animation test1. setARWidgetVisible(1122,true) //set components visible Further, the interaction controlling submodule realizes support of the script language through a built-in script language interpreter, thereby supporting various kinds of application platforms (e.g., IOS, Android, Windows, etc.), and supporting the Lua script file to realize augmented reality interaction. The user may update augmented reality interaction by updating the Lua script at the background or switch the script file locally, causing the interaction more flexible and versatile. Particularly, the augmented reality processing module is preferably a software development kit (SDK) that integrally encapsulates augmented reality functions; the SDK implements a complex augmented reality algorithm and a 3D rendering algorithm at the underlying layer and encapsulates them into a library file; then, under each platform (e.g., IOS, Android, Windows, etc.), further encapsulates the library file into a simple interface in conjunction with logics such as a camera control logic, an FSM state control, etc., such that the user may complete development the augmented reality application with reference to the SDK use manual without knowing implementation details.

The BaseFragment of the SDK (software development kit) is an augmented reality interface base class; during the stage of generating an augmented reality instance, the first user equipment 1 may develop an augmented reality recognition tracking interface by inheriting the BaseFragment; the ARPanel (augmented reality control panel) includes a set of augmented reality effects, which may include a plurality of ARWidgets (augmented reality effect widgets), wherein the ARWidgets include ARImage (AR Image), ARVideo (augmented reality video), ARAudio (AR audio), etc., wherein the Lua interface enables development of an interaction logic between the ARWidgets using the Lua language. Besides, the complex augmented reality algorithm and the 3D rendering algorithm are implemented at the underlying layer of the software application development module, which are encapsulated into a library file. In this way, with reference to the SDK use manual, an augmented reality application developer may complete development of the augmented reality application by simply invoking the interface without knowing the implementation details.

Figure 10:
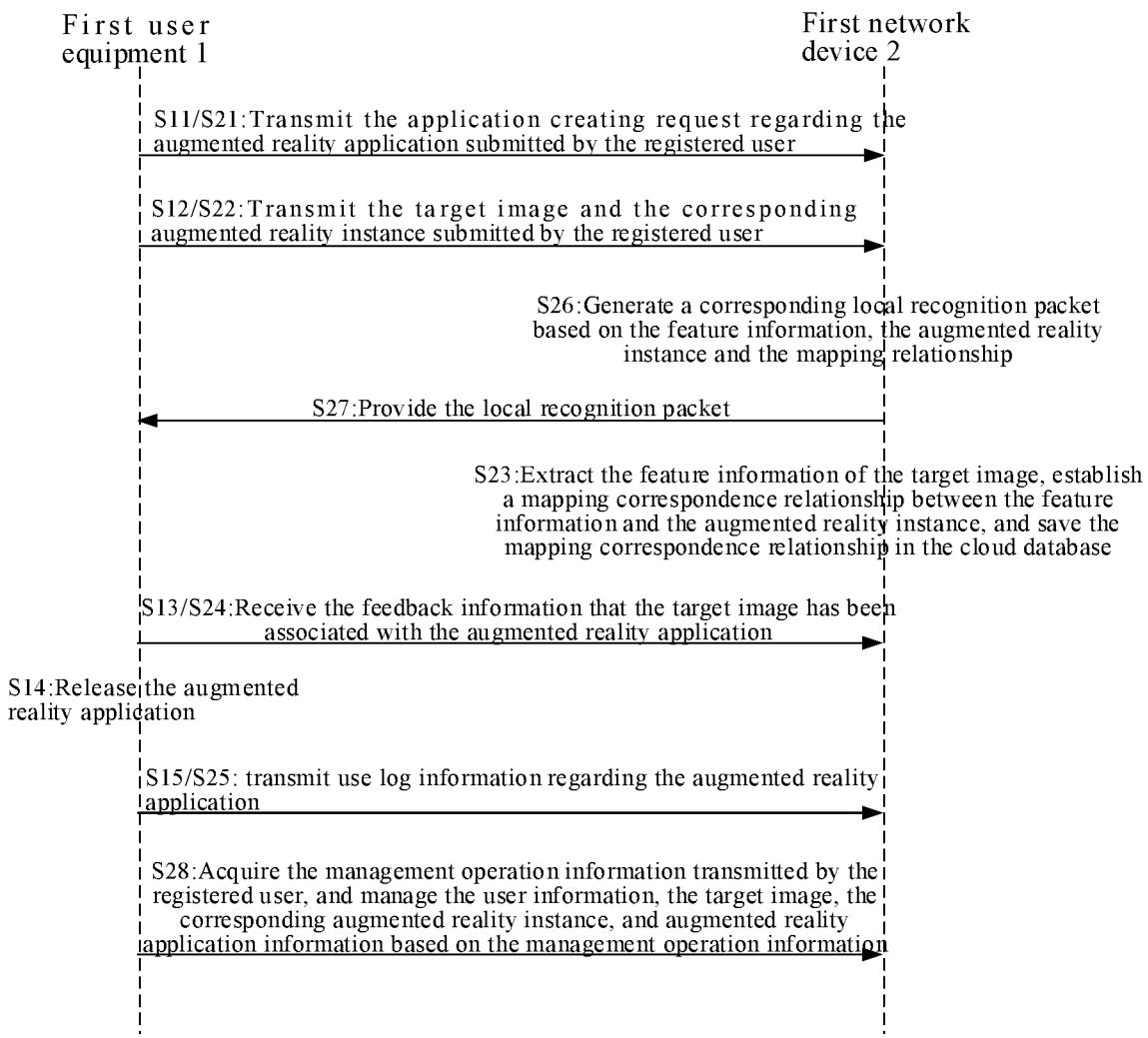
FIG. 10 shows a method schematic diagram of cooperation between a first user equipment and a first network device for generating an augmented reality application provided according to a preferred embodiment of the present disclosure.

FIG. 10 shows a method schematic diagram of cooperation between a first user equipment and a first network device for generating an augmented reality application provided according to a preferred embodiment of the present disclosure. The following is described combined with FIG. 10: the step S11 further comprises: the first user equipment 1 transmits, to a corresponding first network device 2, an application creating request regarding the augmented reality application submitted by a registered user; the first user equipment 1 loads the augmented reality processing module provided by the first network device 2 into the target application to acquire the augmented reality application based on the target application. Specifically, quick loading may be implemented by only inheriting one fragment of the SDK.

Further, the method for generating an augmented reality application in the first user equipment 1 further comprises a step S15 and a step S16: receiving use log information regarding the augmented reality application and transmitted by the first network device 2. Correspondingly, in the step S16, the first network device 2 transmits, to the first user equipment 1, the use log information regarding the augmented reality application. Particularly, the use log information preferably comprises tracking, recording and statistical information of the augmented reality application, and the use log information will constantly update data based on use stages of the augmented reality application.

Preferably, the augmented reality processing module of the augmented reality application comprises a local recognizing submodule for locally recognizing the image captured by the augmented reality application; correspondingly, the method for generating an augmented reality application in the first network device 2 further comprises a step S26 and a step S27, wherein in the step S26, the first network device 2 generates a corresponding local recognition packet based on the feature information, the augmented reality instance, and the mapping relationship; and in the step S27, the first network device 2 provides the local recognition packet to the first user equipment 1.

The first network device 2 extracts feature information of the target image transmitted by the first user equipment 1, generates a cloud feature index based on the feature information, the augmented reality instance and a mapping relationship between the feature information and the augmented reality instance, and updates and saves the feature information, the augmented reality instance, and the cloud feature index into the cloud database; besides, the first network device 2 also generates a local feature index based on the feature information, the augmented reality instance, and the mapping relationship between the feature information and the augmented reality instance; and during the stage of generating the augmented reality application, the first network device 2 may transmit one or more augmented reality instances, the feature information corresponding to each augmented reality instance, and the local feature index, to the first user equipment 1 based on device information of the first user equipment 1.

In a preferred embodiment, based on the cloud mass data and the local constant data, the feature information saved in the cloud feature index is established based on the mass data, and the feature information saved by the local feature index may have different amounts of information based on different algorithms; the subsequent recognition process based on the local feature index and the cloud feature index may adopt different matching algorithms to enhance recognition efficiency and save resource space.

The method for generating an augmented reality application in the first network device 2 further comprises a step S28. In the step S28, the first network device 2 acquires management operation information transmitted by the registered user, and manages the user information, the target image, the corresponding augmented reality instance, and the augmented reality application information based on the management operation information. The first network device 2 provides an administration backend that may interact with an administrator user. The administration backend may be a Web-based display layer application, providing functions such as account registration, login, logout, viewing or changing identity information, changing password information, creating, deleting, and modifying the application, creating, modifying, deleting, and releasing the target image and the augmented reality instance, etc.

Figure 11:
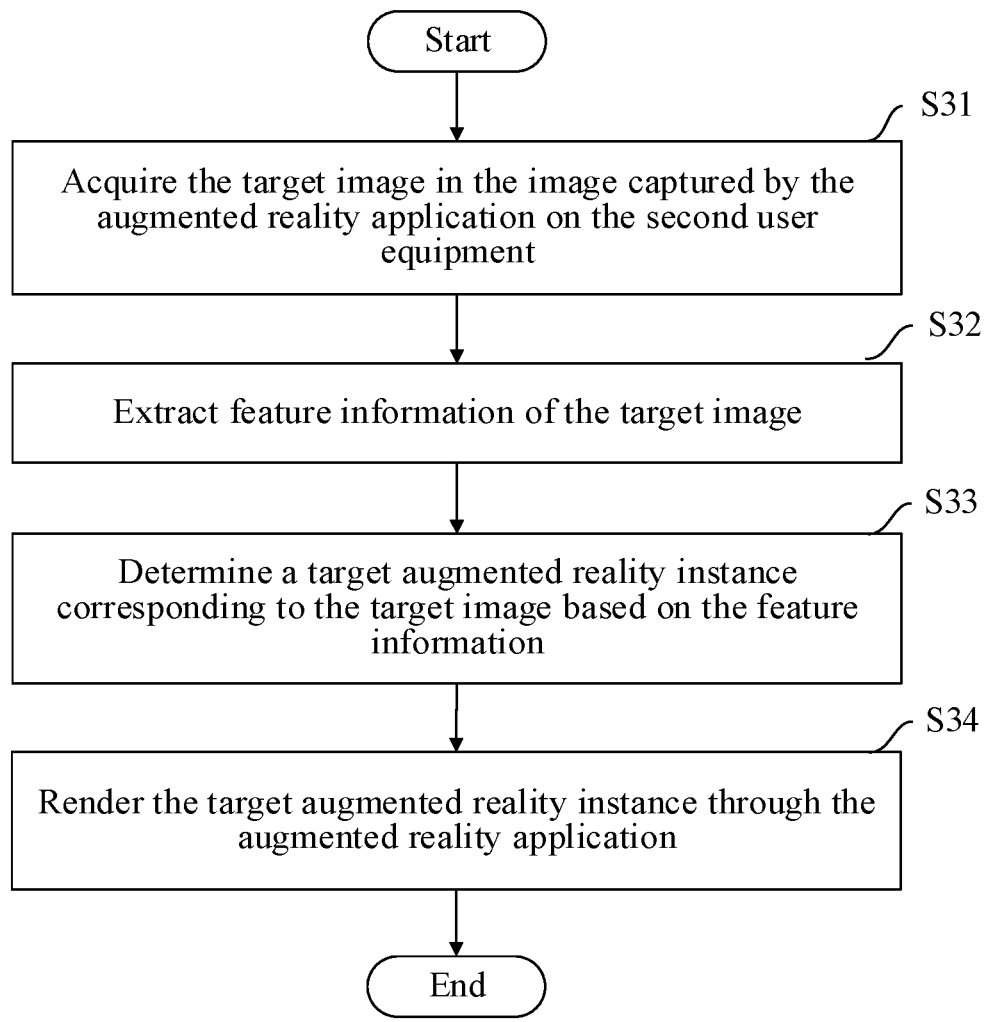
FIG. 11 shows a method schematic diagram of rendering an augmented reality instance by a second user equipment according to an aspect of the present disclosure.

FIG. 11 shows a method schematic diagram of rendering an augmented reality instance by a second user equipment according to an aspect of the present disclosure. The method for rendering an augmented reality instance in a second user equipment comprises a step S31, a step S32, a step S33, and a step S34, wherein in the step S31, the second user equipment 3 acquires a target image in images captured by the augmented reality application on the second user equipment; in the step S32, the second user equipment 3 extracts feature information of the target image; in the step S33, the second user equipment 3 determines a target augmented reality instance corresponding to the target image based on the feature information; and in the step S34, the second user equipment 3 renders the target augmented reality instance through the augmented reality application.

Figure 12:
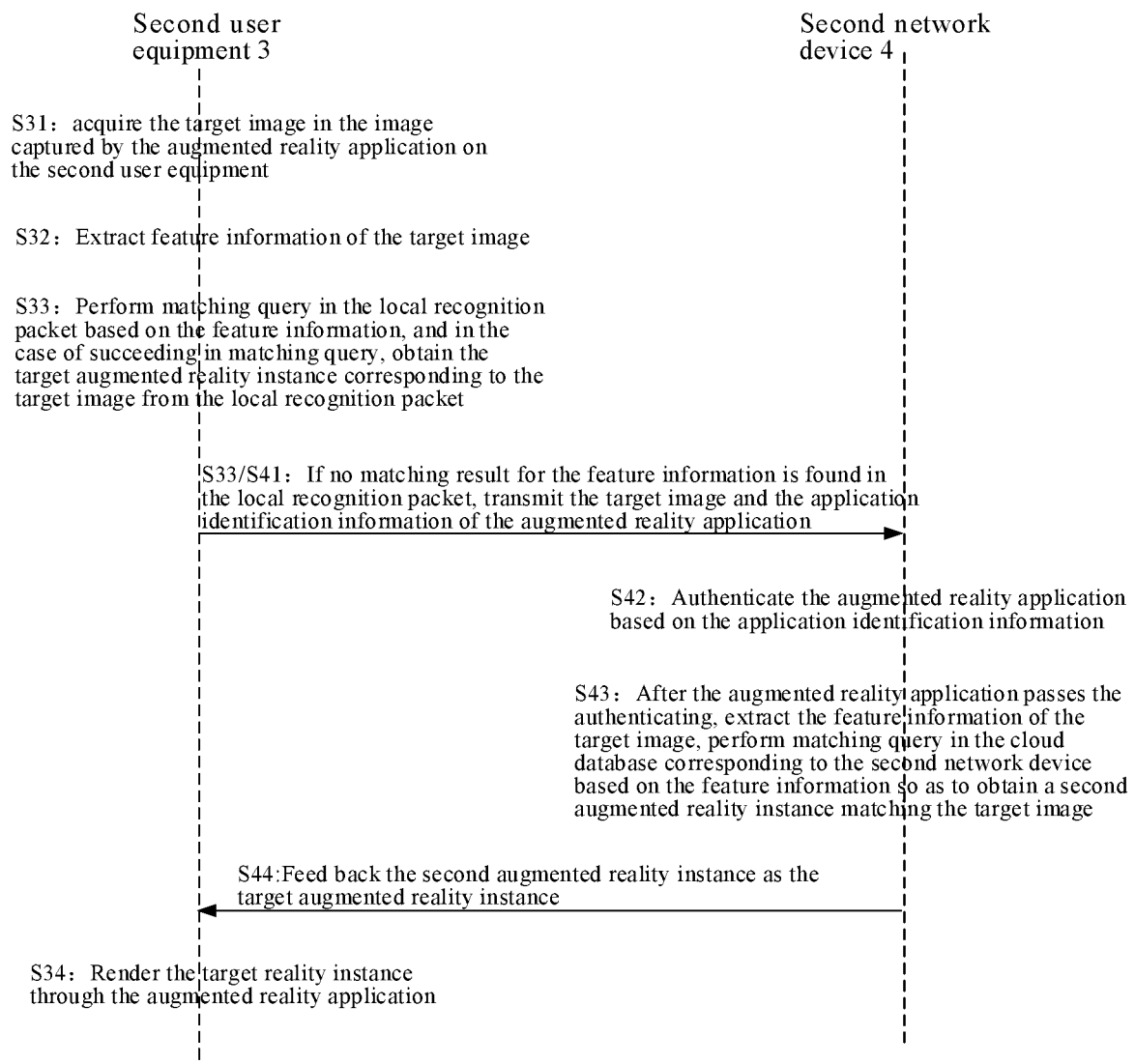
FIG. 12 shows a method schematic diagram of cooperation between a second user equipment and a second network device for rendering an augmented reality instance provided according to an aspect of the present disclosure.

FIG. 12 shows a method schematic diagram of cooperation between a second user equipment and a second network device for rendering an augmented reality instance provided according to an aspect of the present disclosure. The method for rendering an augmented reality instance in a second network device comprises a step S41, a step S42, a step S43, and a step S44. Particularly, in the step S41, the second network device 4 acquires a target image and application identification information corresponding to the augmented reality application, which are transmitted by a corresponding second device; in the step S42, the second network device 4 authenticates the augmented reality application based on the application identification information; in the step S43, the second network device 4 extracts feature information of the target image after the augmented reality application passes the authentication, and performs a matching query in the cloud database corresponding to the second network device based on the feature information so as to obtain a second augmented reality instance matching the target image; and in the step S44, the second network device 4 returns the second augmented reality instance to the second user equipment.

Here, the second user equipment 3 includes, but not limited to, any mobile electronic product that enables a human-machine interaction with a user via a touch pad, e.g., a smart mobile phone, a PDA, etc.; the mobile electronic product may employ any OS (operating system), e.g., the Android OS, the IOS OS, etc. Preferably, the second user equipment 3 may also be a script program running on a device integrated with a touch terminal via a network. The second network device 4 includes, but not limited to, an electronic device which may automatically perform numerical value computation and information processing according to preset or stored instructions, hardware of which includes, but not limited to, a microprocessor, an application-specific integrated circuit (ASIC), a field programmable gate array (FPGA), a digital processor (DSP), an embedded device, etc. The network includes, but not limited to, the Internet, a wide area network, a metropolitan area network, a local area network, a VPN network, and a wireless Ad Hoc network, etc. Preferably, the second network device 4 may also be a script program running on the user equipment, or on a device where the user equipment is integrated with the network device and a touch terminal via a network or where the network device is integrated with a touch terminal via a network.

Besides, the second user equipment 3 and the first user equipment 1 are user equipments in the stage of generating the augmented reality application and the stage of rendering the augmented reality instance, such that they may adopt a same user equipment or a different user equipment; likewise, the second network device 4 and the first network device 2 are instance devices in the stage of generating the augmented reality application and the stage of rendering the augmented reality instance, such that they may adopt a same or a different network device.

Of course, those skilled in the art should understand that the second user equipment 3 and the second network device 4 are only examples, and other existing or future possibly developed second user equipment 3 and second network device 4, if applicable to the present disclosure, should also fall into the protection scope of the present disclosure, which are incorporated herein by reference.

In a preferred embodiment, the second network device 4 may implement, through a Cloud API, processes of receiving the target image, authenticating, performing cloud recognition, and transmitting the augmented reality instance and the corresponding feature information, while the Cloud API mainly performs cloud service request and answer via HTTP. Specifically, in the step S41, the second network device 4 may acquire, via the Cloud API, the target image and the application identification information of the corresponding augmented reality application, which are transmitted by a corresponding second user equipment; in the step S42, the second network device 4 may authenticate the augmented reality application via the Cloud API; in the step S43, the second network device 4 may perform cloud matching query via the Cloud API; and in the step S44, the second network device 4 may return the second augmented reality instance to the second user equipment 3 via the Cloud API.

Here, the augmented reality application has an augmented reality processing module. The content of the augmented reality processing module is identical or substantially identical to the content of the augmented reality processing module in the aforementioned stage of generating the augmented reality application, which thus will not be detailed here for the sake of conciseness and is incorporated here by reference.

In the stage where the user uses the augmented reality application to render the augmented reality instance, the second user equipment 3 captures an image with an image acquiring device (e.g., a video camera, an augmented reality eyewear, etc.), matches and recognizes feature information of the target feature among the captured images, and after a successful matching, presents the target augmented reality instance corresponding to the target image.

Figure 13:
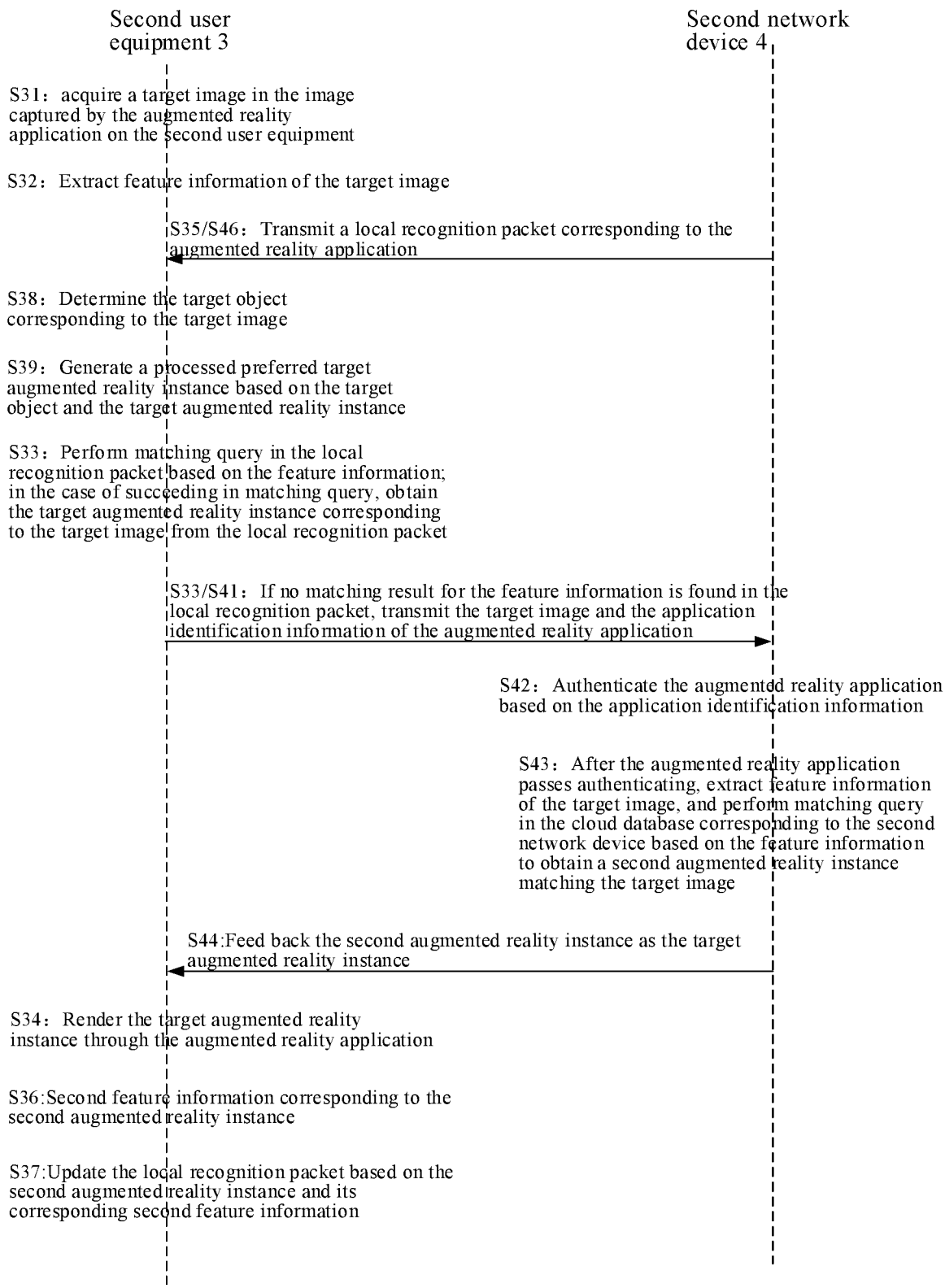
FIG. 13 shows a method schematic diagram of cooperation between a second user equipment and a second network device for rendering an augmented reality instance provided according to a preferred embodiment of the present disclosure; and Like or similar reference numerals represent like or similar components throughout the drawings.

FIG. 13 shows a method schematic diagram of cooperation between a second user equipment and a second network device for generating an augmented reality instance provided according to a preferred embodiment of the present disclosure. The following will be further described combined with FIG. 4.

The second user equipment 3 may adopt a recognition method of smart switching between the local and the cloud, i.e., first recognizing at the local; in the case of failure, automatically switching to cloud recognition.

Besides, the local recognition submodule for locally recognizing the image captured by the augmented reality application provides an invoking interface; by inputting different parameters to the invoking interface, different recognition patterns of the second user equipment 3 may be realized, i.e., local recognition, cloud recognition, and smart switching.

FIG. 5 shows a process schematic diagram of implementing a smart switching between the local recognition and the cloud recognition through cooperation between the second user equipment and the second network device in a preferred embodiment of the present disclosure. Before local recognition, the method for rendering the augmented reality instance in the second network device 4 further comprises a step S46. In the step S46, the second network device 4 transmits a local recognition packet corresponding to the augmented reality application to the second user equipment, wherein the local recognition packet includes one or more augmented reality instances and feature information corresponding to each augmented reality instance. The method for rendering the augmented reality instance in the second user equipment 3 further comprises a step S35. In the step S35, the second user equipment 3 receives the local recognition packet corresponding to the augmented reality application provided by the second network device 4, wherein the local recognition packet includes one or more augmented reality instances and feature information corresponding to each augmented reality instance; specifically the second user equipment 3 transmits, to the second network device 4, current user information, for example, including the time and location information of the augmented reality application, and relevant information of a registered user using the augmented reality application, etc.; the second network device 4 feeds back a specific local recognition packet based on the current information, and the second user equipment 3 caches the local recognition packet.

Next, in the step S31, the second user equipment 3 acquires, on the second user equipment, a target image in the images captured by the augmented reality application; in the step S32, the second user equipment 3 extracts feature information of the target image; in the step S33, the second user equipment 3 performs matching query in the local recognition packet based on the feature information, and in the case of a successful matching, acquires a target augmented reality instance corresponding to the target image from the local recognition packet to complete the recognition locally.

If no matching result for the feature information is found in the local recognition packet, in the step S33, the second user equipment 3 transmits the target image and application identification information of the augmented reality application to the second network device 4, such that the second network device 4 performs a cloud matching query; in the step S41, the second network device 4 acquires the target image and the application identification information corresponding to the augmented reality application, which are transmitted by the corresponding second user equipment 3, wherein each augmented reality application will create, during the stage of generating the augmented reality application, a unique application recognition information for identifying the identity of the augmented reality application; in the step S42, the second network device 4 authenticates the augmented reality application based on the application identification information; in the step S43, the second network device 4 extracts feature information of the target image when the augmented reality application passes the authentication, and performs matching query in the cloud database corresponding to the second network device 4 based on the feature information to obtain a second augmented reality instance matching the target image, the cloud database including a cloud database established during the stage of generating the augmented reality application; in the step S44, the second network device 4 returns the second augmented reality instance to the second user equipment; next, in the step S33, the second user equipment 3 receives the second augmented reality instance matching the target image and the application identification information and fed back by the second network device 4, as the target augmented reality instance corresponding to the target image. After obtaining the corresponding target augmented reality instance, in the step S34, the second user equipment 3 renders the target augmented reality instance through the augmented reality application. Preferably, the method for rendering the augmented reality instance in the second user equipment further comprises a step S36 and a step S37, wherein after the second user equipment 3 receives the second feature information corresponding to the second augmented reality instance and transmitted by the second network device in the step S36, in the step S37, the second user equipment 3 updates the local recognition packet based on the second augmented reality instance and its corresponding second feature information; further, the method for rendering the augmented reality instance in the second network device 4 further comprises a step S45, wherein in the step S45, the second network device 4 returns the second feature information corresponding to the second augmented reality instance to the second user equipment; in the step S37, the second user equipment 3 updates the local recognition packet based on the second augmented reality instance and its corresponding second feature information. When the user re-recognizes the target image with the second user device 3, it may directly present the corresponding target augmented reality instance after obtaining the query matching result through the local recognition packet, which thereby reduces the times of cloud recognition access and speeds up system reaction.

Here, the target image may be a picture, a photograph, a scene image, a real object image, or an object with a specific shape, etc. The local recognition packet may include one or more augmented reality instances and its corresponding feature information. The augmented reality instance may include: associated augmented reality content (including, but not limited to, video, audio, link, 2D animation, 3D animation, etc.) and a corresponding augmented reality display effect.

In a preferred scene, the second user equipment 3 is configured for recognizing a certain real scene. For example, in a sightseeing scene, the second user equipment 3 receives all recognition packets of a corresponding sightseeing scene transmitted by the second network device 4 based on the geographical location of the user; the user then may perform local recognition within the sightseeing scene; when the user leaves the corresponding sightseeing scene to another scene, the second user equipment 3 may acquire an augmented reality instance other than the sightseeing scene using cloud recognition and presents it.

Further, the method for rendering the augmented reality instance in the second user equipment further comprises a step S38 and a step S39, wherein in the step S38, the second user equipment 3 determines a target object corresponding to the target image; in the step S39, the second user equipment 3 generates a processed preferred target augmented reality instance based on the target object and the target augmented reality instance; correspondingly, in the step S34, the second user equipment 3 renders the processed preferred target augmented reality instance through the augmented reality application.

In a preferred embodiment, the second user equipment 3 may also recognize and track continuous images (e.g., video, etc.) with respect to a specified region, so as to present the corresponding reality instance in the specified region.

Specifically, after the second user equipment 3 acquires continuous images (input with a unit of frames) and captures the images using an image acquisition device, in the step S38, the second user equipment 3 first determines whether the user has already selected a region; if not, it enters the stage of region selection, so as to determine a specified region as the target object by acquiring the user's region selection operation, acquire feature information of the specified region, and bind the feature information and the corresponding target augmented reality effect; next, in the step S39, the second user equipment 3 predicts a motion trajectory of the target image, and selects a candidate region from the target image based on the motion trajectory; in the step S39, the second user equipment 3 matches the feature information of the candidate region with the feature information of the target object, and when the match succeeds, determines the accurate position information of the target object; in the step S39, the second user equipment 3 associates the target instance with the accurate position information to generate a processed preferred target augmented reality instance, thereby implementing that in the continuous images, the preferred target augmented reality instance is presented following the position of the specified region of the real scene selected by the user. Here, the thirty-third unit may invoke a region tracking submodule of the augmented reality processing module, which tracks a set region in the augmented reality instance corresponding to the image captured by the augmented reality application to thereby implement region tracking.

In another preferred embodiment, the second user equipment 3 may also perform fuzzy recognition based on a class of target objects rather than a single target object.

Specifically, the second user equipment 3 first captures a target image in the images; in the step S38, the second user equipment 3 performs salient point detection to the feature of the target image and extracts a profile of the fuzzy recognition object or a region including the fuzzy recognition object in the target image; in the step S38, the second user equipment 3 recognizes the profile of the fuzzy recognition object or the region including the fuzzy recognition object based on a machine learning model so as to determine that the fuzzy recognition object is the target object. Next, in the step S39, the second user equipment 3 associates the target instance with the accurate position information to generate a processed preferred target augmented reality instance. Here, the thirty-seventh unit may invoke the fuzzy recognizing submodule for fuzzily recognizing the image captured by the augmented reality application to recognize the fuzzy recognition object.

Here, the fuzzy recognition is not directed to a certain frame of image or a certain object, but to a non-specific object. Such non-specific object may be: objects of the same kind, e.g., apple, banana, etc.; objects of the same topological structure, e.g., web, star, etc.; objects of the same geometrical shape, e.g., rectangle, round, etc.; the class recognition model used by the fuzzy recognition is a model already learned in advance through a machine learning method, wherein the training data may be based on the data provided during use process of a plurality of augmented reality applications.

In another preferred embodiment, the second user equipment 3 may also perform fuzzy recognition based on a class of target objects rather than a single target object and track the fuzzy recognition object.

Specifically, the second user equipment 3 first captures a target image in the images; in the step S38, the second user equipment 3 performs salient point detection to the feature of the target image, and extracts a profile of the fuzzy recognition object in the target image or a region including the fuzzy recognition object in the target image; in the step S38, the second user equipment 3 recognizes the profile of the fuzzy recognition object or the region including the fuzzy recognition object based on a machine learning model so as to determine that the fuzzy recognition object is the target object. Next, in the step S39, the second user equipment 3 associates the target instance with the accurate position information to generate a processed preferred target augmented reality instance.

Next, in the step S39, the second user equipment 3 predicts a motion trajectory of the target image (i.e., the fuzzy recognition object), and selects a candidate region from the target image based on the motion trajectory; the second user equipment 3 matches the feature information of the candidate region with the feature information of the target object, and when the matching succeeds, determines the accurate position information of the target object; the second user equipment 3 associates the target instance with the accurate position information to generate a processed preferred target augmented reality instance, for example, presenting the target instance at an accurate position in the target object, presenting the target instance around the accurate position of the target object (e.g., presenting surrounding the target object, presenting above, below, left, or right to the target object), thereby implementing that in the continuous images, the preferred target augmented reality instance is presented following the position of the specified region of the real scene selected by the user. Here, a fuzzy tracking submodule of the augmented reality processing module for fuzzily tracking a set target in the augmented reality instance corresponding to the image captured by the augmented reality application may be invoked to implement fuzzy recognition tracking.

Further, the augmented reality processing module comprises a 3D engine submodule for rendering the augmented reality instance corresponding to the image captured by the augmented reality application, and in the step S34, the second user equipment 3 determines whether the augmented reality instance is a 3D animation; if so, invokes the 3D engine submodule in the augmented reality application to render the augmented reality instance.

Further, the step S34 further comprises: the second user equipment 3 acquiring an interaction script file defined by the user, invoking an interaction controlling submodule in the augmented reality application to interpret and execute the interaction script file, and rendering the augmented reality instance based on a result of executing the interaction script file. Specifically, the second user equipment 3 acquires the interactive operation executed by the user, reads information about the user's operation (click, slide, etc.), interprets and executes a function in the corresponding script to modify display parameter, for example, modify the display parameter of the 3D animation; and re-invokes the 3D engine to display the corresponding augmented reality instance, to thereby complete the interactive process. Particularly, the second user equipment 3 may leverage an interaction controlling submodule of the augmented reality processing module for controlling interactions between the user and the augmented reality instance corresponding to the image captured by the augmented reality application to thereby implement interaction.

Specifically, the script file is prepared by the developer in advance; the interaction controlling submodule of the augmented reality processing module has an interpreter having a script language, which may interpret the script file for interaction submitted by the user and executes the interpreted interaction language. What is provided below is an instance (test.lua) of an LUA script (a kind of script language):

ARPanel =nil
function onARPanelInit(ARPanel)
ARPanel =ARPanel
ARPanel:setARWidgetVisible(1111, true);
End Besides, the second network device 4 provides an administration backend that may interact with an administrator user. The administration backend may be a Web-based display layer application, providing functions such as account registration, login, logout, viewing or changing identity information, changing password information, creating, deleting, and modifying the application, creating, modifying, deleting, and releasing the target image and the augmented reality instance, etc. The second network device 4 continuously updates the use log information in the stage of rendering the augmented reality application, including tracking, recording, and statistical information of the augmented reality application, etc., and renders them through the administration backend upon request by an administrator user.

Compared with the prior art, according to the embodiments of the present disclosure, pre-fetching by local recognition and cloud recognition and a smart switching function therebetween are implemented through the cooperation between the second user equipment and the second network device for rendering the augmented reality instance, and by pre-caching a local recognition packet having part of augmented reality instances, firstly performing local recognition with the local recognition packet, and then performing cloud recognition after failure of the local recognition, problems such as excessively occupying the storage space and too long network response delay are avoided. Besides, the recognition patterns may be switched based on the user's needs in the real scene, which satisfies the versatility of the user scene needs. The second user device not only implements the recognition and tracking function of the underlying object, but also may provide functions of facilitating presentation of the augmented reality content, including presentation of video and 3D animation content. The second user equipment interprets and executes the script file through an interaction controlling submodule, thereby implementing a cross-platform augmented reality interaction definition mechanism, thereby being suited for multiple platforms and causing the user' interactive behaviors more flexible. The second user equipment supports region tracking, fuzzy recognition, and fuzzy recognition tracking, which increases the versatility of augmented reality presentation.

Further, the second network device further supports recording log information of the augmented reality application, including tracking, recording, and statistical information, which increases the accuracy of running information of the augmented reality application.

A further aspect of the present disclosure provides a system for generating an augmented reality application and rendering an augmented reality instance. The system comprises a first user equipment, a first network device, a second user equipment, and a second network device in the foregoing embodiments; through cooperation between respective devices, the system provides a complete augmented reality service platform for a developer user to develop an augmented reality application and for a use user to use the augmented reality application to render the augmented reality instance.

It should be noted that the present disclosure may be implemented in software and/or a combination of software and hardware; for example, it may be implemented by a application-specific integrated circuit (ASIC), a general-purpose computer, or any other similar hardware device. In one embodiment, the software program of the present disclosure may be executed by a processor so as to implement the above steps or functions. Likewise, the software program of the present disclosure (including relevant data structure) may be stored in a computer readable recording medium, for example, a RAM memory, a magnetic or optical driver, or a floppy disk, and similar devices. Besides, some steps of functions of the present disclosure may be implemented by hardware, for example, a circuit cooperating with the processor to execute various functions or steps.

In addition, a part of the present disclosure may be applied as a computer program product, for example, a computer program instruction, which, when executed by a computer, through the operation of the computer, may invoke or provide the method and/or technical solution according to the present disclosure. However, the program instructions invoking the method of the present disclosure may be stored in a fixed or removable recording medium, and/or transmitted through a data stream in broadcast or other signal bearer medium, and/or stored in the working memory of a computer device running according to the program instructions. Here, one embodiment according to the present disclosure includes a device, which includes a memory for storing computer program instructions and a processor for executing program instructions, wherein, when the computer program instructions are executed by the processor, the device is triggered to run the methods and/or technical solutions based on the previously mentioned multiple embodiments of the present disclosure.

To those skilled in the art, it is apparent that the present disclosure is not limited to the details of the above exemplary embodiments, and the present disclosure may be implemented with other forms without departing from the spirit or basic features of the present disclosure. Thus, in any way, the embodiments should be regarded as exemplary, not limitative; the scope of the present disclosure is limited by the appended claims, instead of the above depiction. Thus, all variations intended to fall into the meaning and scope of equivalent elements of the claims should be covered within the present disclosure. No reference signs in the claims should be regarded as limiting the involved claims. Besides, it is apparent that the term "comprise/comprising/include/including" does not exclude other units or steps, and singularity does not exclude plurality. A plurality of units or means stated in the apparatus claims may also be implemented by a single unit or means through software or hardware. Terms such as the first and the second are used to indicate names, but do not indicate any particular sequence.

We claim:

1. A method for generating an augmented reality application at a first user equipment end, comprising:
    transmitting, to a corresponding first network device, an application creating request regarding the augmented reality application submitted by a registered user, wherein the augmented reality application includes an augmented reality processing module provided by the first network device, and loading the augmented reality processing module provided by the first network device into a target application to acquire the augmented reality application based on the target application;
    transmitting, to the first network device, a target image and a corresponding augmented reality instance submitted by the registered user, wherein the first network device extracts feature information of the target image, establishes a mapping relationship between the feature information and the augmented reality instance, and saves the mapping relationship in a cloud database;
    receiving feedback information that the target image has been associated with the augmented reality application, which is transmitted by the first network device; and
    releasing the augmented reality application;
    wherein the augmented reality processing module is a software development kit (SDK) that integrally encapsulates augmented reality functions;
    wherein loading the augmented reality processing module provided by the first network device into the target application is implemented by inheriting a fragment of the SDK;
    wherein the augmented reality processing module comprises at least a 3D engine submodule for rendering the augmented reality instance corresponding to the image captured by the augmented reality application;
    wherein rendering the target augmented reality instance through the augmented reality application comprises:
    determining whether the augmented reality instance is a 3D animation; if so, invoking the 3D engine submodule to render the augmented reality instance.

2. The method according to claim 1, further comprising:
    receiving use log information regarding the augmented reality application, which is transmitted by the first network device.

3. The method according to claim 1, wherein the augmented reality processing module further comprises at least one of:
    a local recognizing submodule for locally recognizing an image captured by the augmented reality application;
    a fuzzy recognizing submodule for fuzzily recognizing the image captured by the augmented reality application;
    a region tracking submodule for tracking a set region in the augmented reality instance corresponding to the image captured by the augmented reality application;
    a fuzzy tracking submodule for fuzzily tracking a set target in the augmented reality instance corresponding to the image captured by the augmented reality application; and
    an interaction controlling submodule for controlling an interaction between a user and the augmented reality instance corresponding to the image captured by the augmented reality application.

4. The method according to claim 3, wherein the region tracking submodule is further configured to:
predict a motion trajectory of the target image, and select a candidate region from the target image based on the motion trajectory;
determine accurate position information of a target object by matching feature information of the candidate region with feature information of the target object; and
associate a target augmented reality instance with the accurate position information to generate a processed preferred target augmented reality instance;
wherein the interaction controlling submodule is further configured to:
acquire an interaction script file defined by the user, interpret and execute the interaction script file, and render the augmented reality instance based on a result of executing the interaction script file.

5. A non-transitory computer readable storage medium, including computer code, which, when being executed, causes a method according to claim 1 to be executed.

6. The method according to claim 1,
wherein the 3D engine submodule is encapsulated with an OpenGL library render module;
wherein the 3D engine submodule is configured to perform a plurality of controls for the 3D animation, including at least one of animation play speed, start frame and end frame of animation play.

7. A method for generating an augmented reality application at a first network device end, comprising:
receiving an application creating request regarding the augmented reality application submitted via a corresponding first user equipment by a registered user, wherein the augmented reality application includes an augmented reality processing module provided by the first network device, and the augmented reality application is created by loading the augmented reality processing module into a target application;
acquiring a target image and a corresponding augmented reality instance, which are transmitted by the registered user via the first user equipment;
extracting feature information of the target image, establishing a mapping relationship between the feature information and the augmented reality instance, and saving the mapping relationship in a cloud database; and
associating the target image with the augmented reality application based on the application creating request transmitted by the first user equipment, and transmitting feedback information that the target image has been associated with the augmented reality application to the first user equipment;
wherein the augmented reality processing module is a software development kit (SDK) that integrally encapsulates augmented reality functions;
wherein loading the augmented reality processing module provided by the first network device into the target application is implemented by inheriting a fragment of the SDK;
wherein the augmented reality processing module comprises at least a 3D engine submodule for rendering the augmented reality instance corresponding to the image captured by the augmented reality application;
wherein rendering the target augmented reality instance through the augmented reality application comprises:

determining whether the augmented reality instance is a 3D animation; if so, invoking the 3D engine submodule to render the augmented reality instance.

8. The method according to claim 7, further comprising:
transmitting use log information regarding the augmented reality application to the first user equipment.

9. The method according to claim 7, wherein the augmented reality processing module comprises a local recognizing submodule for locally recognizing an image captured by the augmented reality application;
wherein, the method further comprises:
generating a corresponding local recognition packet based on the feature information, the augmented reality instance, and the mapping relationship; and
providing the local recognition packet to the first user equipment.

10. The method according to claim 7, further comprising:
acquiring management operation information transmitted by the registered user, and managing user information, the target image, the corresponding augmented reality instance, and augmented reality application information based on the management operation information.

11. A non-transitory computer readable storage medium, including computer code, which, when being executed, causes a method according to claim 7 to be executed.

12. A method for rendering an augmented reality instance at a second user equipment end, comprising:
acquiring, on the second user equipment, a target image in an image captured by an augmented reality application, the augmented reality application is created by loading an augmented reality processing module provided by a first network device into a target application, wherein the augmented reality processing module is a software development kit (SDK) that integrally encapsulates augmented reality functions, and wherein loading the augmented reality processing module provided by the first network device into the target application is implemented by inheriting a fragment of the SDK;
extracting feature information of the target image;
determining a target augmented reality instance corresponding to the target image based on the feature information;
rendering the target augmented reality instance through the augmented reality application; and
receiving a local recognition packet corresponding to the augmented reality application provided by a second network device, wherein the local recognition packet includes one or more augmented reality instances and feature information corresponding to each augmented reality instance;
wherein determining a target augmented reality instance corresponding to the target image based on the feature information comprises:
performing matching query in the local recognition packet based on the feature information to obtain a target augmented reality instance corresponding to the target image;
wherein determining a target augmented reality instance corresponding to the target image based on the feature information further comprises:
transmitting the target image, and application identification information of the augmented reality application, to the second network device when no matching result for the feature information is found in the local recognition packet; and
receiving a second augmented reality instance matching the target image and the application identification information and fed back by the second network device, as the target augmented reality instance corresponding to the target image;
wherein the augmented reality processing module comprises at least a 3D engine submodule for rendering the augmented reality instance corresponding to the image captured by the augmented reality application;
wherein rendering the target augmented reality instance through the augmented reality application comprises:
determining whether the augmented reality instance is a 3D animation; if so, invoking the 3D engine submodule to render the augmented reality instance.

13. The method according to claim 12, further comprising:
receiving second feature information corresponding to the second augmented reality instance, which is transmitted by the second network device;
updating the local recognition packet based on the second augmented reality instance and the second feature information corresponding to the second augmented reality instance.

14. The method according to claim 12, further comprising:
determining a target object corresponding to the target image; and
generating a processed preferred target augmented reality instance based on the target object and the target augmented reality instance;
wherein rendering the target augmented reality instance through the augmented reality application comprises:
rendering the processed preferred target augmented reality instance through the augmented reality application.

15. The method according to claim 14, wherein determining a target object corresponding to the target image comprises:
performing salient point detection to a feature of the target image, and extracting a profile of a fuzzy recognition object or a region including the fuzzy recognition object in the target image; and
recognizing the profile of the fuzzy recognition object or the region including the fuzzy recognition object based on a machine learning model to determine the fuzzy recognition object as the target object.

16. The method according to claim 14, wherein generating a processed preferred target augmented reality instance based on the target object and the target augmented reality instance comprises:
predicting a motion trajectory of the target image, and selecting a candidate region from the target image based on the motion trajectory; and
determining accurate position information of the target object by matching feature information of the candidate region with feature information of the target object;
associating the target augmented reality instance with the accurate position information to generate a processed preferred target augmented reality instance.

17. The method according to claim 12, wherein rendering the target augmented reality instance through the augmented reality application further comprises:
acquiring an interaction script file defined by the user, invoking an interaction controlling submodule in the augmented reality application to interpret and execute the interaction script file, and rendering the augmented reality instance based on a result of executing the interaction script file.

18. A non-transitory computer readable storage medium, including computer code, which, when being executed, causes a method according to claim 12 to be executed.

19. A method for rendering an augmented reality instance at a second network device end, comprising:
acquiring a target image and application identification information of a corresponding augmented reality application, which are transmitted by a corresponding second user equipment, wherein the augmented reality application is created by loading an augmented reality processing module provided by a first network device into a target application, wherein the augmented reality processing module is a software development kit (SDK) that integrally encapsulates augmented reality functions, and wherein loading the augmented reality processing module provided by the first network device into the target application is implemented by inheriting a fragment of the SDK;
authenticating the augmented reality application based on the application identification information;
extracting feature information of the target image after the augmented reality application passes the authentication, and performing a matching query in a cloud database corresponding to the second network device based on the feature information so as to obtain a second augmented reality instance matching the target image; and
returning the second augmented reality instance to the second user equipment;
wherein the augmented reality processing module comprises at least a 3D engine submodule for rendering the augmented reality instance corresponding to the image captured by the augmented reality application;
wherein rendering the target augmented reality instance through the augmented reality application comprises:
determining whether the augmented reality instance is a 3D animation; if so, invoking the 3D engine submodule to render the augmented reality instance.

20. The method according to claim 19, further comprising:
returning second feature information corresponding to the second augmented reality instance to the second user equipment.

21. The method according to claim 19, further comprising:
transmitting a local recognition packet corresponding to the augmented reality application to the second user equipment, wherein the local recognition packet includes one or more augmented reality instances and feature information corresponding to each augmented reality instance.

22. A non-transitory computer readable storage medium, including computer code, which, when being executed, causes a method according to claim 19 to be executed.

* * * * *